(12) United States Patent
Takenaka et al.

(10) Patent No.: US 9,683,724 B2
(45) Date of Patent: Jun. 20, 2017

(54) LIGHTING DEVICE

(71) Applicant: HONDA MOTOR CO., LTD., Tokyo (JP)

(72) Inventors: Nobuyuki Takenaka, Wako (JP); Kazuhiro Hirakida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 462 days.

(21) Appl. No.: 14/333,762

(22) Filed: Jul. 17, 2014

(65) Prior Publication Data

US 2015/0029738 A1 Jan. 29, 2015

(30) Foreign Application Priority Data

Jul. 26, 2013 (JP) .................. 2013-156013

(51) Int. Cl.
*F21V 15/01* (2006.01)
*B62J 6/00* (2006.01)
*B62J 6/02* (2006.01)
*B60Q 1/00* (2006.01)
*B60Q 1/068* (2006.01)
*F21S 8/10* (2006.01)

(52) U.S. Cl.
CPC .......... *F21V 15/012* (2013.01); *B60Q 1/0035* (2013.01); *B60Q 1/0683* (2013.01); *B62J 6/00* (2013.01); *B62J 6/02* (2013.01); *F21S 48/1109* (2013.01); *F21S 48/1159* (2013.01); *F21S 48/1311* (2013.01); *F21S 48/155* (2013.01); *F21S 48/328* (2013.01); *F21S 48/33* (2013.01)

(58) Field of Classification Search
CPC ... F21V 15/012; B60Q 1/0035; B60Q 1/0683; B62J 6/00; B62J 6/02; F21S 48/1109; F21S 48/1159; F21S 48/1311; F21S 48/155; F21S 48/328; F21S 48/33
See application file for complete search history.

(56) References Cited

U.S. PATENT DOCUMENTS

| 2007/0109806 | A1* | 5/2007 | Tsukamoto | .......... F21S 48/1109 362/545 |
| 2008/0247182 | A1* | 10/2008 | Yasuda | .................. B60Q 1/076 362/465 |
| 2012/0044711 | A1* | 2/2012 | Konishi | ................. B60Q 1/007 362/487 |

FOREIGN PATENT DOCUMENTS

JP 4582791 9/2010

* cited by examiner

*Primary Examiner* — Anabel Ton
(74) *Attorney, Agent, or Firm* — Rankin, Hill & Clark LLP

(57) ABSTRACT

A lighting device includes a housing including a front opening portion and a rear opening portion; a light source unit including LED light sources and a heat sink configured to absorb and radiate heat produced by the LED light source; a socket formed by an elastic member and configured to allow the heat sink to be fitted and supported in the rear opening portion such that part of the heat sink is exposed rearward through the rear opening portion and that aiming adjustment is enabled by changing a position of the light source unit relative to the housing. A knob used for manually turning an adjustment screw is attached to a rear end portion of the adjustment screw, and the socket is provided with a rib extending along a circumferential direction of the socket and protruding rearward of the heat sink.

15 Claims, 21 Drawing Sheets

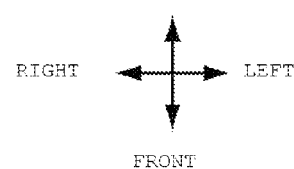
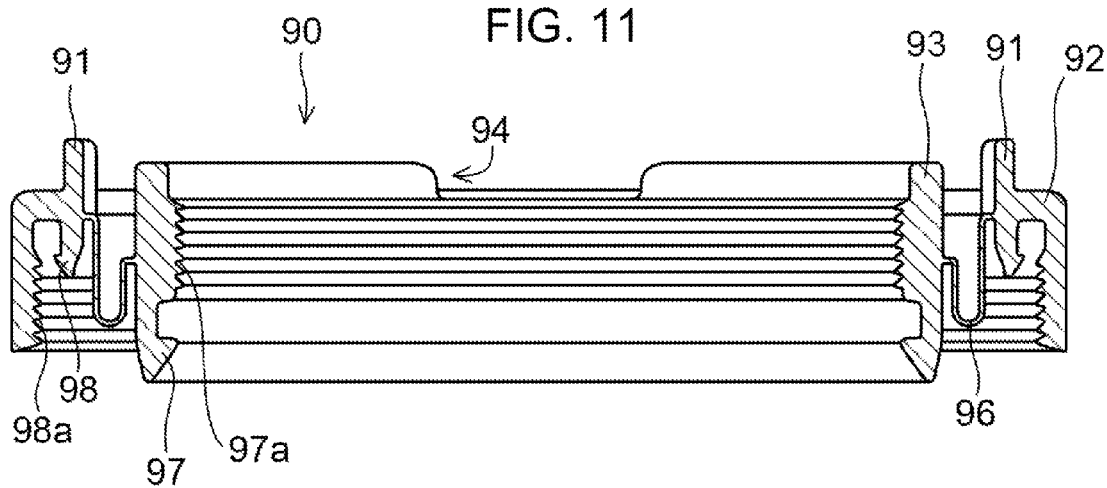
FIG. 11

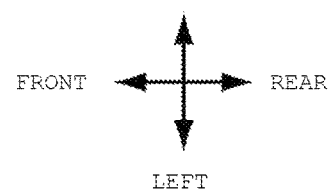
FIG. 21
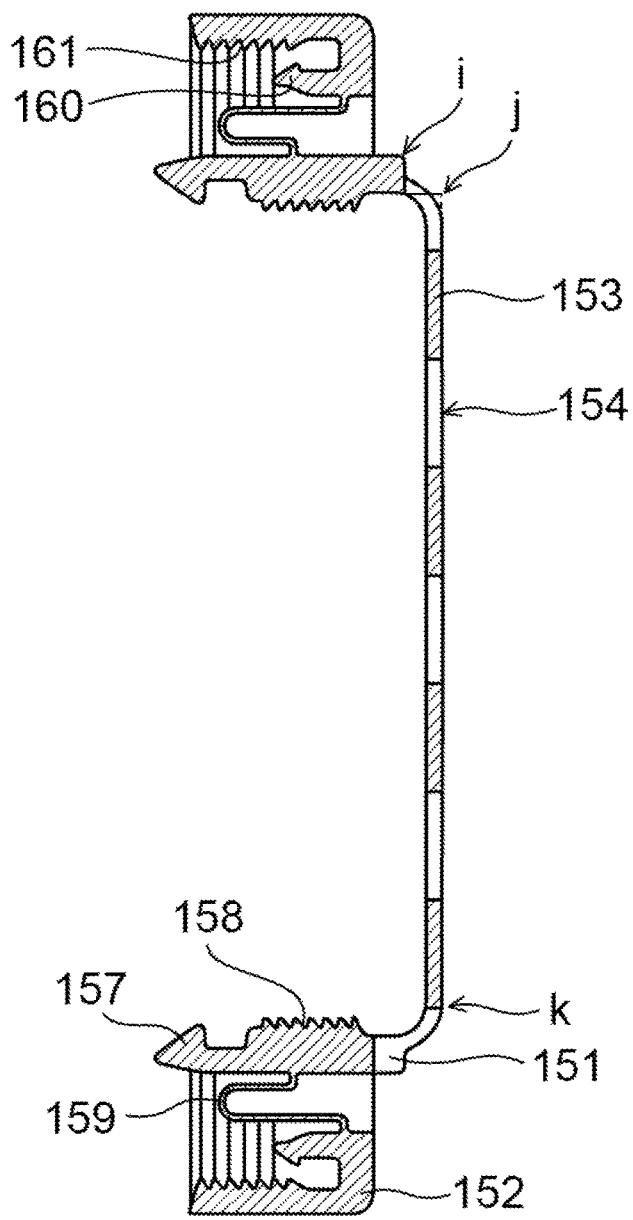

LIGHTING DEVICE

BACKGROUND OF THE INVENTION

Field of the Invention

The present invention relates to a lighting device including a light source unit having an LED light source and a heat sink configured to cool the LED light source.

Description of Related Art

Conventionally, a lighting device is known, which includes a light source unit integrally having a light source formed by an LED (light-emitting diode) element and a heat sink configured to cool the LED light source. In such a lighting device, an aiming mechanism for adjusting an irradiation direction (optical axis) of the lighting device is generally configured to adjust the angle of placement of the light source unit relative to a housing of the lighting device.

Japanese Patent No. 4582791 discloses a lighting device (front lamp) for vehicle using LED elements as light sources and having the following configuration. The lighting device includes a light source unit having LED elements and a heat sink adjacently placed on a vehicle rear side of the LED elements, and a screw for adjusting an optical axis is exposed at a position outside the heat sink in a vehicle width direction.

SUMMARY OF THE INVENTION

It is conceivable to employ a configuration in which a knob is attached in advance to a screw head of an optical axis adjustment screw located at a rear-surface side of the lighting device, and is turned directly by hand. In this configuration, if the knob is adjacent to the heat sink, a consideration is needed to hinder approach to the heat sink of a hand trying to turn the knob. The lighting device described in Japanese Patent No. 4582791, however, does not have a structure devised to hinder such approach to the heat sink.

The present invention is directed toward solving the problem in the conventional technique and providing a lighting device capable of hindering approach of a hand during optical-axis adjustment to a heat sink cooling an LED light source.

According to one aspect of the invention, a lighting device includes: a housing including a front opening portion and a rear opening portion; a lens covering the front opening portion; a light source unit including an LED light source placed in a space surrounded by the housing and the lens, and a heat sink configured to absorb and radiate heat produced by the LED light source; a socket formed by an elastic member and configured to allow the heat sink to be fitted and supported in the rear opening portion such that part of the heat sink is exposed rearward through the rear opening portion and that aiming adjustment is enabled by changing a position of the light source unit relative to the housing; and an aiming adjustment mechanism located outside the rear opening portion and exposed on a rear-surface side of the housing. A knob used for manually turning the adjustment mechanism is attached to a rear end portion of the adjustment mechanism, and the socket is provided with a rib extending in a circumferential direction of the socket and protruding rearward of the heat sink.

The knob used for manually turning the adjustment mechanism is attached to the rear end portion of the adjustment mechanism, and the socket is provided with the rib extending in the circumferential direction of the socket and protruding rearward of the heat sink. Thus, when a hand of an operator approaches the heat sink to turn the aiming adjustment knob, the hand is likely to touch the rib before it touches the heat sink. Thereby, the operator can be aware that the heat sink is located nearby, which can hinder approach of the hand of the operator to the heat sink.

In accordance with another aspect of the present invention, the socket has an outer annular portion fitted and supported in the rear opening portion, an inner annular portion in which the heat sink is fitted and supported, and a thinned portion being interposed between the outer annular portion and the inner annular portion and enabling them to be displaced relative to each other, and the rib is formed on the outer annular portion. Thus, the rib is placed away from the heat sink and close to the adjustment knob, which makes it more likely that a hand touches the rib, making the operator be aware.

In accordance with another aspect of the present invention, out of a plurality of radiator fins provided to the heat sink, one located near the rib is formed such that a rear end portion thereof is located frontward of a rear end portion of the inner annular portion. Hence, the radiator fin at a position likely to be touched by a hand during aiming adjustment protrudes less. Thus, the possibility of a hand of an operator approaching the radiator fins can be reduced.

In accordance with another aspect of the present invention, when an operator puts a hand on the knob to operate the knob, the rib is located between the hand of the operator and the heat sink. Thus, the effect of hindering approach of a hand of an operator to the heat sink can be enhanced even more.

In accordance with another aspect of the present invention, the rib is formed in symmetrical shapes at two symmetrical locations which are along a circumferential direction of the socket and face each other. Material saving is achieved by such provision of the rib at only necessary portions. Moreover, this allows even application of force during assembly work to fit the socket around the heat sink, and also, improves outer appearance due to the symmetry.

According to another aspect of the invention, the lighting device is used for a motorcycle, and the motorcycle has the head pipe enabling steering of the steering handle gripped by a driver for the lighting device, and the left and right front forks which are provided at left and right front portions of the head pipe, are steered integrally with the steering handle, and have the front wheel attached to the lower ends thereof. The lighting device is supported by the head pipe at a position frontward of the left and right front forks, and the steering handle is provided with the handle lock mechanism configured to disable the steering handle from turning with the steering handle being turned to the left side. The knob is placed to the left of the heat sink in the vehicle width direction. Thus, a configuration is achieved in which turning of the steering handle to the left creates a space for inserting a hand of an operator to perform aiming adjustment. This can eliminate the need to provide an excess space for performing aiming adjustment, and as a result, an interspace between the lighting device and the front forks can be reduced.

Moreover, since the knob is placed at the side at which the handle is locked when turned thereto, there is no need to turn the steering handle from a handle lock state to a state for performing aiming adjustment or from the state for performing aiming adjustment to the handle lock state. Operability is thus improved.

BRIEF DESCRIPTION OF THE DRAWINGS

FIG. 11 is a sectional view taken along line 11-11 in FIG. 9.

FIG. 21 is a sectional view taken along line 21-21 in FIG. 20.

DETAILED DESCRIPTION OF THE PREFERRED EMBODIMENTS

Figure 1:
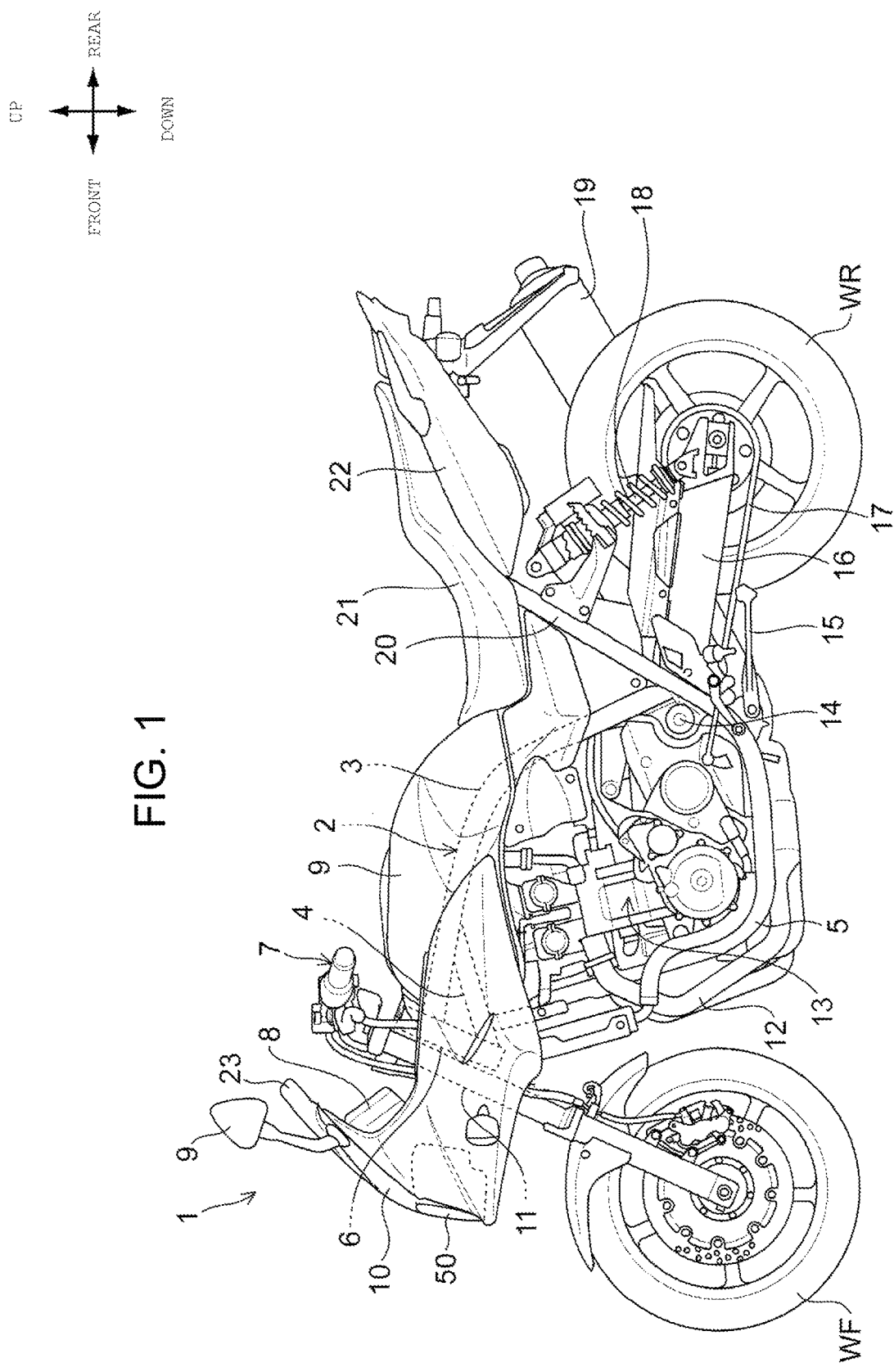
FIG. 1 is a left-side view of a motorcycle to which a lighting device according to one embodiment of the present invention is applied.

A preferred embodiment of the present invention is described in detail below with reference to the drawings. FIG. 1 is a left-side view of a motorcycle 1 to which a front lamp (lighting device) 50 according to one embodiment of the present invention is applied. A vehicle-body frame 2 of the motorcycle 1 has left and right main frames 3 extending to a vehicle-body rear side from an upper portion of a head pipe 6, paired under frames 5 extending downward from a reinforcement pipe 4 connecting a lower portion of the head pipe 6 to lower surfaces of the main frames 3, and a seat frame 20 extending from rear portions of the under frames 5 to the vehicle-body rear side and a vehicle-body upper side.

In front of the head pipe 6, left and right front forks 11 by which a front wheel WF is rotatably supported is supported in such a manner as to be steerable to the left and right, relative to the head pipe 6. A steering handle 7 for steering the front wheel WF is attached to upper end portions of the front forks 11.

An engine 13 is placed in a space surrounded by the main frames 3 and the under frames 5. Behind the engine 13, a pivot 14 is placed at an area where the main frames 3 and the under frames are connected, the pivot 14 serving as a swing shaft of a swing arm 16 by which a rear wheel WR is pivotally and rotatably supported. A side kickstand 15 attached below the pivot 14 is deployed for parking with a vehicle body tilted to the left in a vehicle width direction.

An exhaust pipe 12 is attached to the engine 13 to feed a combustion gas to a muffler 19 placed at the vehicle-body rear side. Driving force of the engine 13 is transmitted to the rear wheel WR via a drive chain 17. The swing arm 16 is pivotally and swingably supported at a front side thereof by the pivot 14, and is suspended at a rear side thereof from the seat frame 20 by paired left and right rear cushions 18.

A fuel tank 9 having a shape striding the main frames 3 in the vehicle width direction is placed above the engine 13. A seat 21 is attached behind the fuel tank 9, and left and right seat cowls 22 are placed under a rear portion of the seat 21. A windshield screen 23 and a front cowl 10 having the front lamp 50 are placed in front of the front forks 11.

A meter device 8 is placed between the front lamp 50 and the steering handle 7. Left and right rear-view mirrors 9 are attached to respective outer portions of the windshield screen 23 in the vehicle width direction.

Figure 2:
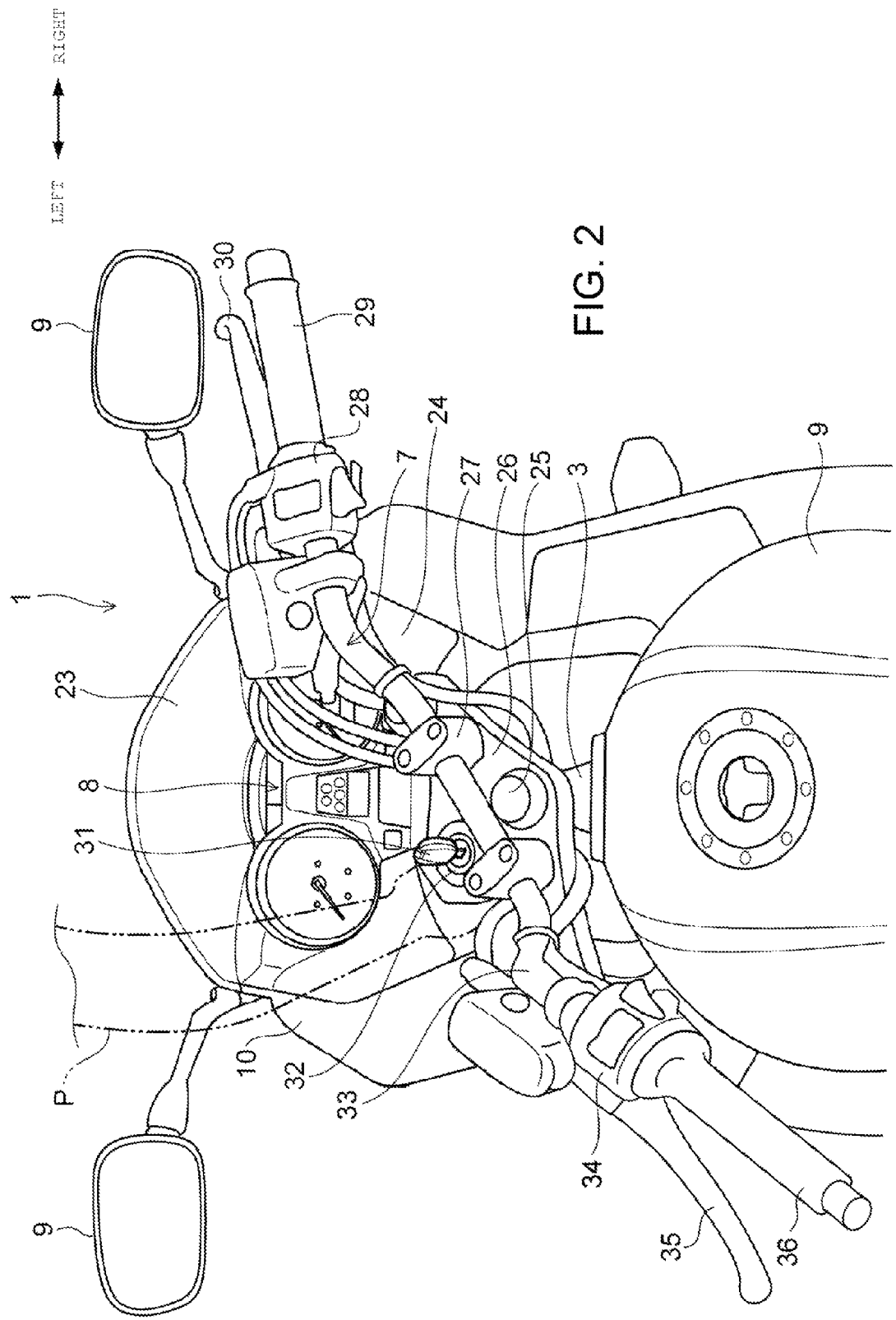
FIG. 2 is an enlarged view of an area around a handle of the motorcycle.
Figure 3:
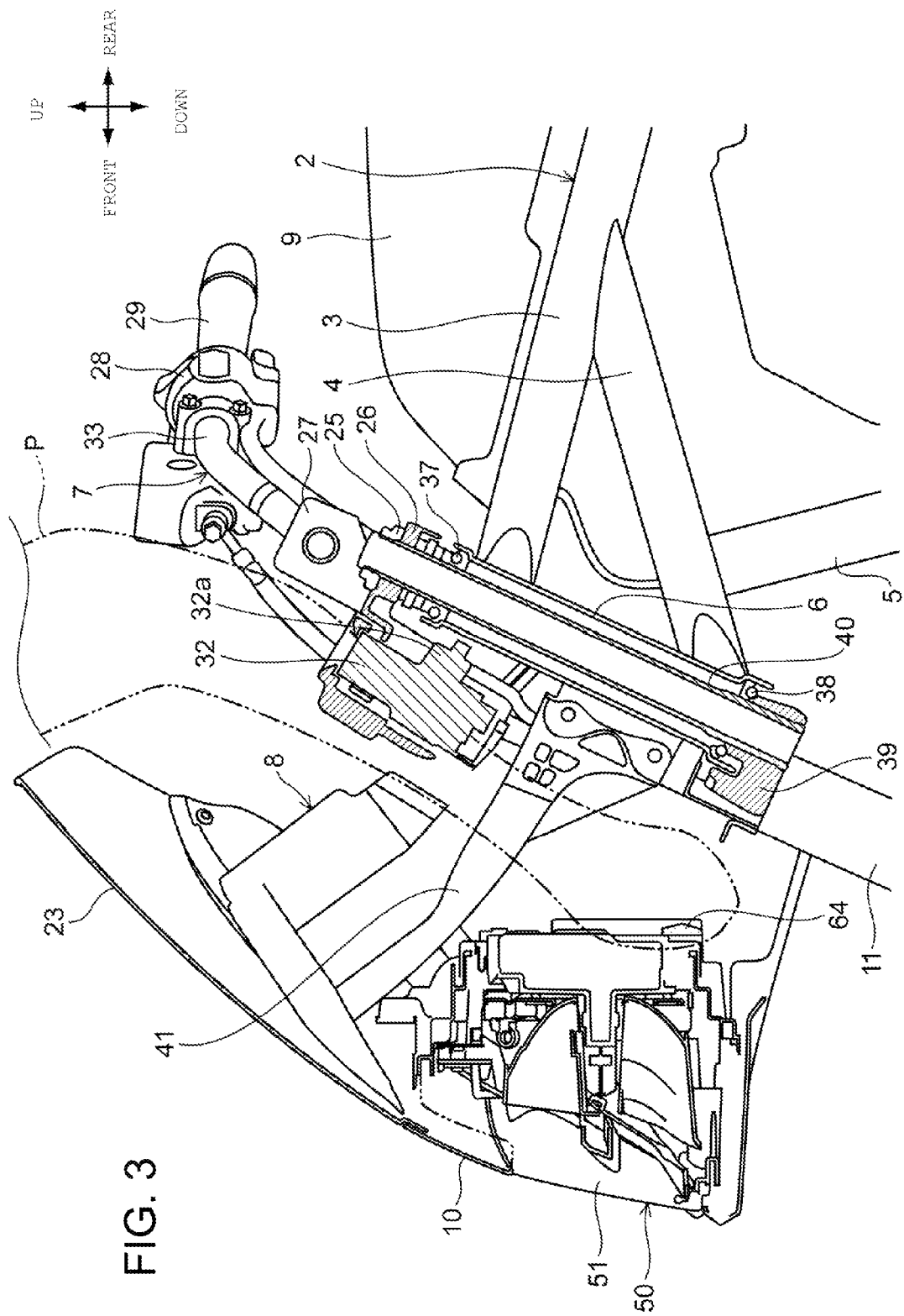
FIG. 3 is a sectional view of a section taken at a center, in a lateral direction, of the area around the handle of the motorcycle, the section being seen from the left in a vehicle width direction.

FIG. 2 is an enlarged diagram showing an area around the handle of the motorcycle 1. Moreover, FIG. 3 is a sectional view showing a section taken at the center, in a lateral direction, of the area around the handle of the motorcycle 1, the section being seen from the left in the vehicle width direction. Reference numerals that are the same as ones above denote the same or similar portions.

Upper end portions of the left and right front forks 11 are supported by a top bridge 26 at positions outward, in the vehicle width direction, of handle clamps 27 supporting the steering handle 7. The top bridge 26 is affixed to an upper end of a stem pipe 40 with a stem nut 25, the stem pipe 40 being pivotally and turnably supported by the head pipe 6 via bearings 37, 38. An ignition switch 32 to be operated by a portable key 31 is placed at a vehicle-body front portion of the top bridge 26.

The ignition switch 32 is provided with a handle lock device 32a configured to hold the steering handle 7 at a predetermined position reached when the steering handle 7 is turned to the left. The handle lock device 32a has a structure in which steering of the steering handle 7 is disabled when a lock pin projects out upon turning of a key cylinder to a predetermined position, and then engages with an engagement hole (not shown) formed in a side surface of the stem pipe 40.

A right handle switch 28, a handle grip 29 being a controller for a throttle device, and a front wheel brake lever 30 are attached to a right end portion of a handle pipe 33 fixed to the handle clamp 27. A left handle switch 34, a handle grip 36, and a clutch lever 35 are attached to a left end portion on the other side.

The meter device 8 is an integral unit in which an analog speedometer and an analog revolution indicator are integrated with digital indicators. An inner cowl 24 is provided between the meter device 8 and the front cowl 10 to cover an interspace between them from above so that outer appearance is enhanced. A lower end portion of the stem pipe 40 is affixed to a bottom bridge 39 gripping the left and right front forks 11. By screwing the stem nut 25 to the upper end of the stem pipe 40, which is inserted into the head pipe 6 from below, the bottom bridge 39 is turnably supported by the vehicle-body frame 2.

The front cowl 10 is supported mainly by a cowl stay 41 being attached to a front side surface of the head pipe 6 and extending frontward. The front lamp 50 is affixed such that a lens 51 covering the front of the front lamp 50 engages with a square window formed in the front cowl 10.

A disk-shaped adjustment knob 64 is provided at a lower position rearward of the front lamp 50, for vertical adjustment of an optical axis (aiming adjustment). In a screw mechanism employed in this embodiment, a lower side of a lamp body is moved frontward and rearward with an upper side of the lamp body used as a point of support. Accordingly, the adjustment knob 64, which is directly connected to the screw mechanism, is also placed at a position close to a lower portion of the front lamp 50.

However, it is usually expected that the adjustment knob 64 is accessed from an upper side of the front cowl 10 partly because an interspace between a lower portion of the front cowl 10 and the front forks 11 is set to be small for reasons such as reduction in wind noise.

In the motorcycle 1 according to this embodiment, the handle lock device 32*a* used in parking is configured to be locked with the steering handle 7 turned to the left. In this state of being turned to the left, an interspace between the meter device 8 and the steering handle 7 as well as the front forks 11 is widened, facilitating insertion of a hand. Since the adjustment knob 64 is offset to the left in the vehicle width direction, an arm P can be naturally inserted between the meter device 8 and the front forks 11. Further, since the vehicle body is tilted to the left when the motorcycle 1 is parked by use of the side kickstand 15, a rider can easily operate the adjustment knob 64 while standing on the left side of the vehicle body.

Light sources of the front lamp 50 are LED (light-emitting diode) elements producing a large amount of heat, and a heat sink configured to cool the LED elements is partly exposed through a rear surface portion of the front lamp 50. The front lamp 50 according to the invention of the present application has a structure hindering approach of a hand of a rider to the heat sink when the rider operates the adjustment knob 64 by inserting the arm P from the position mentioned above.

Figure 4:
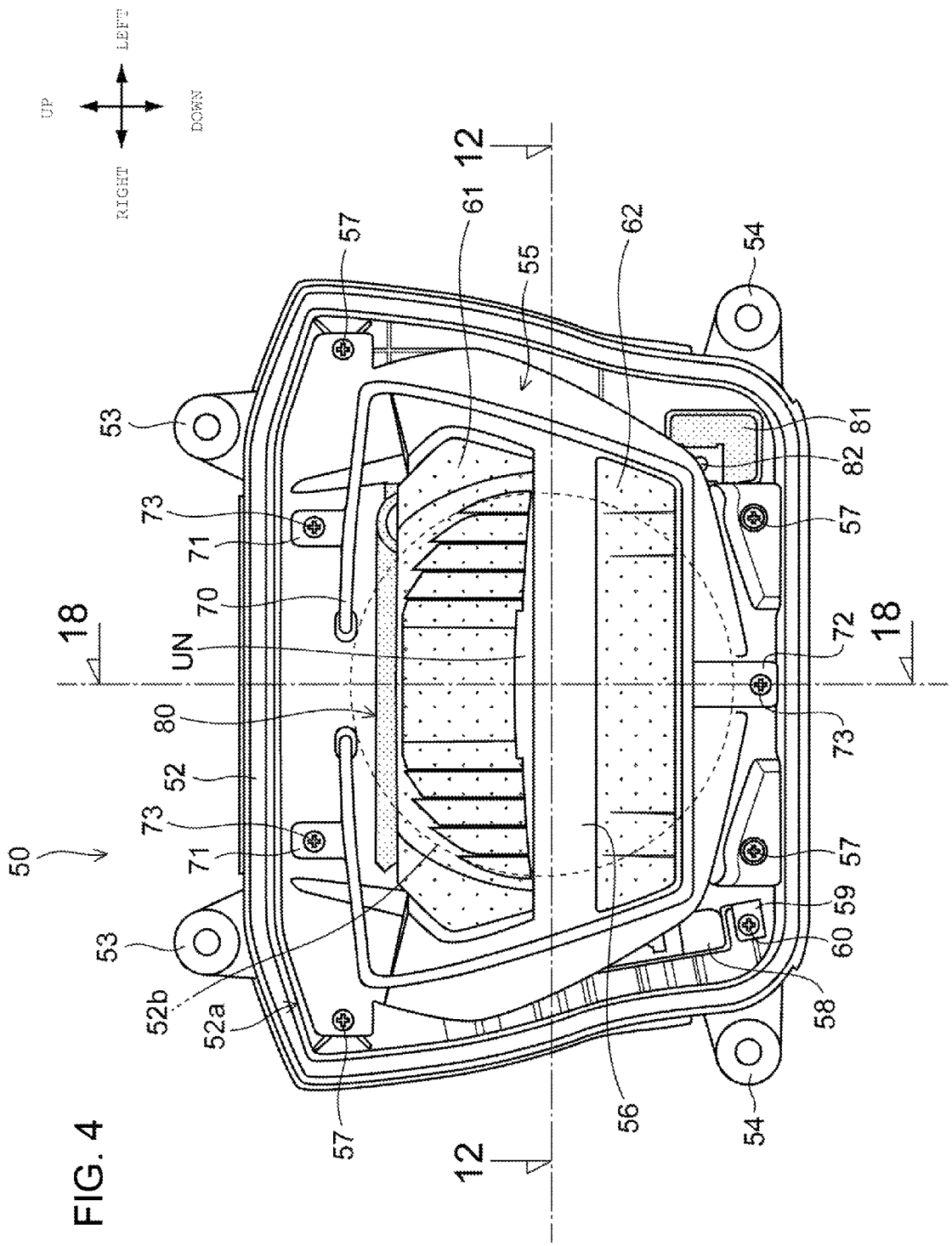
FIG. 4 is a front view of a front lamp.
Figure 5:
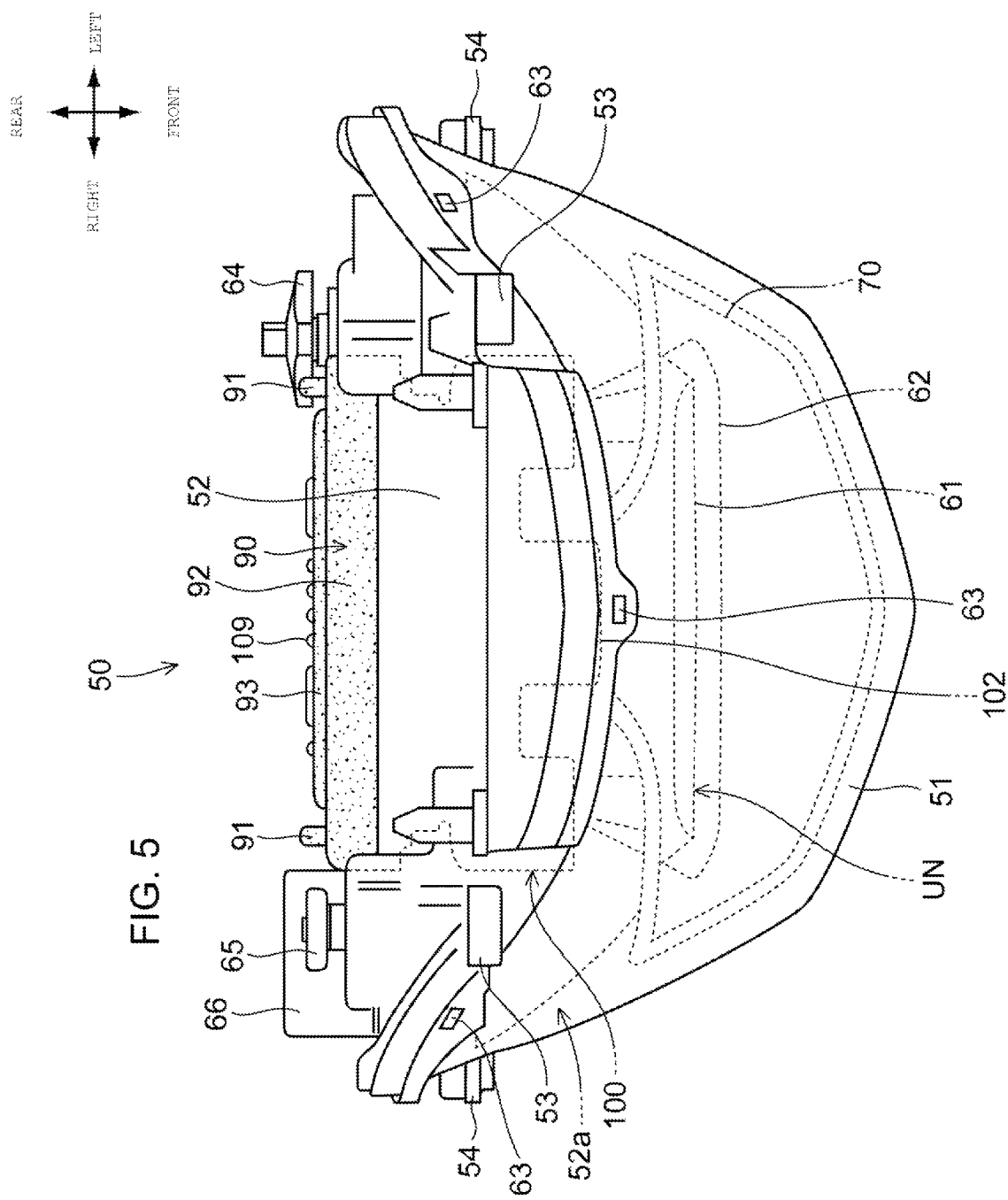
FIG. 5 is a top view of the front lamp.
Figure 6:
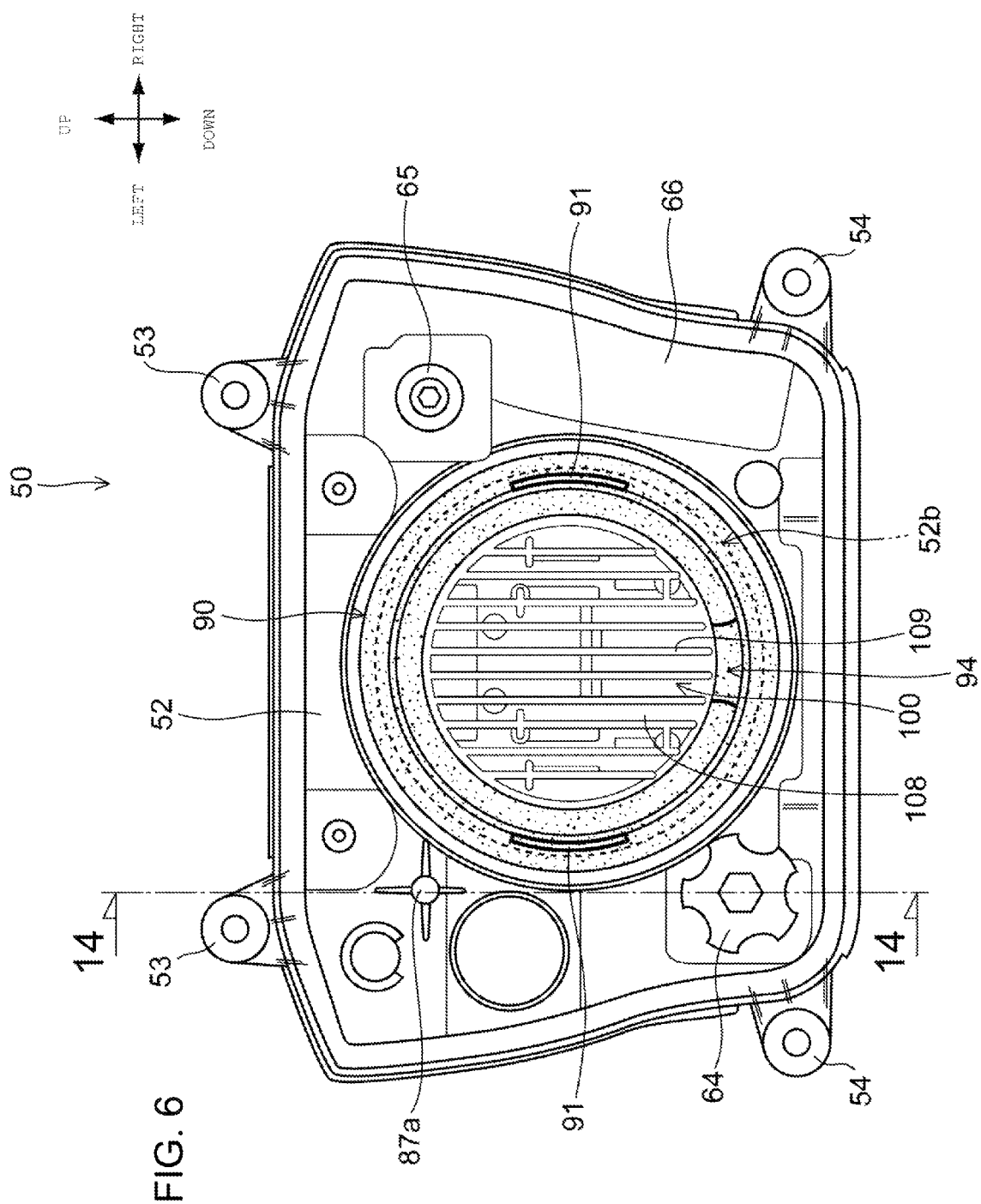
FIG. 6 is a rear view of the front lamp.

FIG. 4 is a front view of the front lamp 50. Moreover, FIG. 5 is a top view of the front lamp 50, and FIG. 6 is a rear view of the front lamp 50. FIG. 4 shows a state where the lens 51 which is made of a translucent resin and uncut is removed.

The front lamp 50 has the following structure. Specifically, the LED light sources, reflectors, and the like are attached to the inside of a housing 52 made of a black synthetic resin or the like from a front opening portion 52*a*, of the housing 52, provided at a vehicle-body front side, and then, the front opening portion 52*a* is closed up with the lens 51. The lens 51 is affixed to the housing 52 by engagement of multiple claws 63 and adhesion. A circular rear opening portion 52*b* is formed at a rear-surface side of the housing 52, the rear opening portion 52*b* exposing the heat sink.

Left and right jutting stays 53 are provided at a top surface of the housing 52 to allow the front lamp 50 to be supported by a rear surface of the front cowl 10, and similar left and right jutting stays 54 are provided at lower portions of side surfaces of the housing 52.

Functional components in the housing 52, namely a light guide member 70 shaped as a round bar having a circular cross section, an extension 55 having upper and lower window portions with a partition portion 56 extending in the vehicle width direction in between, and a light source unit UN (see FIG. 7) to which a low-beam reflector 61 and a high-beam reflector 62 are attached, are arranged from the vehicle-body front side in the order mentioned.

The light source unit UN is affixed to an aiming plate 80. Vertical adjustment of the optical axis is enabled by rotation of an adjustment screw 82, being an adjustment mechanism, in engagement with an extension portion 81 provided to a lower left portion of the aiming plate 80. A heat sink 100 is provided on the vehicle-body rear side of the light source unit UN, and is partly exposed to the rear-surface side through the rear opening portion 52*b* of the housing 52, with the light source unit UN being housed at a predetermined position in the housing 52.

The light guide member 70 having a circular cross section and made of an acrylic material or the like is configured to emit light from its entire body by the light sources placed close to end surfaces thereof located at the vehicle-body upper side, and is affixed to the extension 55 via light guide member stays 71, 72 by use of screws 73. Both end surfaces of the light guide member 70 penetrate an upper portion of the extension 55 toward the vehicle-body rear side.

The extension 55 supporting the light guide member 70 is affixed to a wall surface of the housing 52 by use of screws 57 located at its four corners. The extension 55 has a shape making the low-beam reflector 61 face frontward through the upper window thereof and the high-beam reflector 62 face frontward through the lower window thereof, with the partition portion 56 extending in the vehicle width direction in between.

A driver 58 configured to light the LED light sources of the front lamp 50 is placed on the rear-surface side of the extension 55 and to the right of the high-beam reflector 62 in the vehicle width direction. The driver 58 is affixed to the wall surface of the housing 52 via a driver attachment stay 59 by use of a screw 60.

The light source unit UN is mainly constituted by the LED light sources and the heat sink 100. The heat sink 100 has a center portion 101 having a thick plate shape and supporting the LED light sources and a disk portion 108 having a thin circular column shape and connected to the center portion 101 at the vehicle-body rear side thereof. A rear surface portion of the disk portion 108 is exposed to the vehicle-body rear side through the rear opening portion 52*b* of the housing 52. Thereby, heat of the light sources transmitted to the heat sink 100 is released to the outside of the housing 52.

In this embodiment, an annular socket 90 configured to allow the disk portion 108 to be supported by the rear opening portion 52*b* is fitted around an outer circumferential surface of the disk portion 108. The socket 90 is made of a flexible rubber or the like, and has a function to prevent ingress of moisture or the like into the inside of the housing 52, as well as to enable aiming operation to be performed with the disk portion 108 being fitted in the rear opening portion 52*b*.

A bulging portion 66 for accommodation of the driver 58 is formed at the rear-surface side of the housing 52 and to the right of the socket 90. Provided at an upper portion of the housing 52 at the rear-surface side thereof are a support portion 87*a* of a screw 84 (see FIG. 19) about which the aiming plate 80 swings and an adjustment screw 65 for adjusting right and left angles of the aiming plate 80. Since lateral aiming adjustment is performed less frequently than vertical aiming adjustment, the adjustment screw 65 is configured to be turned by use of a tool such as a wrench.

Multiple radiator fins 109 extending in vehicle-body upper and lower directions are formed at the rear-surface side of the disk portion 108 of the heat sink 100. The invention of the present application is characterized in that, as a structure for hindering approach of a hand to the radiator fins 109 when the hand turns the adjustment knob 64, the socket 90 is provided, at its rear-surface side, with ribs 91 protruding to the vehicle-body rear side.

The height of each rib 91, i.e., the position of an end portion of the rib 91 at the vehicle-body rear side is extended to a position located more toward the vehicle-body rear side than a rear end portion of each radiator fin 109 and which is almost the same as the position of the aiming adjustment knob 64. The ribs 91 are each a plate-shaped member formed by making part of the socket 90 protrude, have a shape curving along the circumference of the socket 90, and are provided symmetrically in the vehicle width direction.

Figure 7:
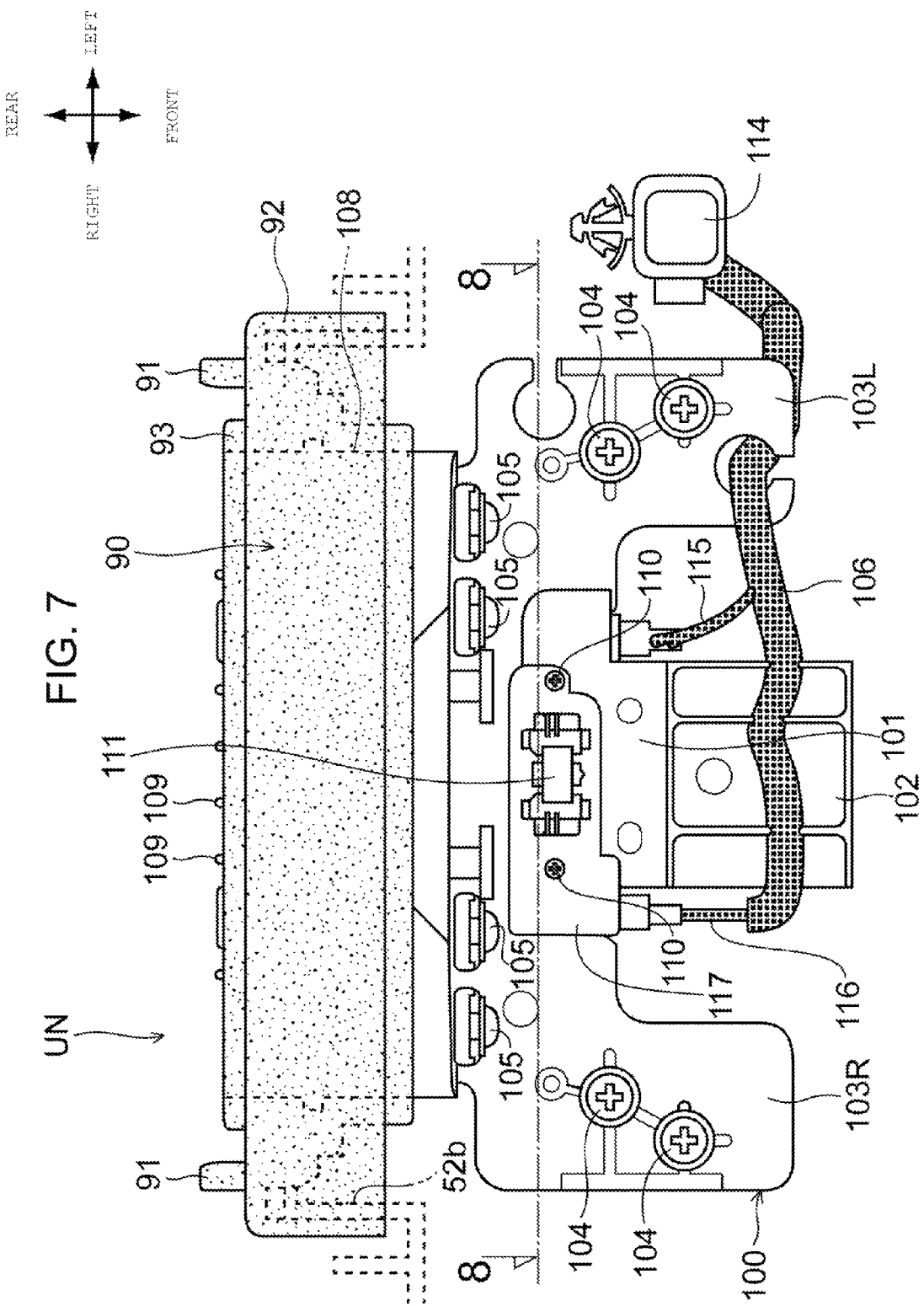
FIG. 7 is a top view of a light source unit.
Figure 8:
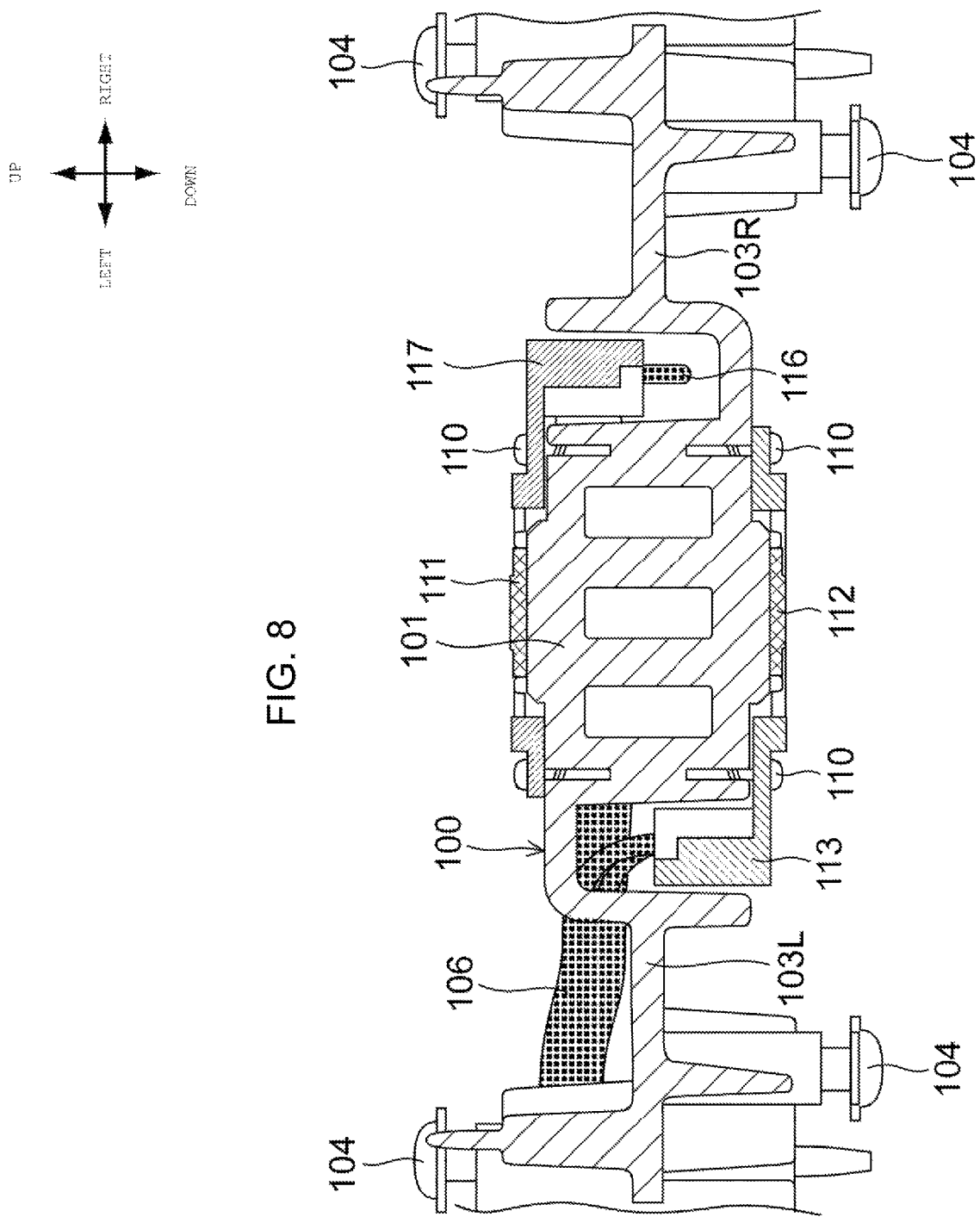
FIG. 8 is a sectional view taken along line 8-8 in FIG. 7.

FIG. 7 is a top view of the light source unit UN. Moreover, FIG. 8 is a sectional view taken along line 8-8 in FIG. 7. As described earlier, the light source unit UN mainly includes the LED light sources and the heat sink 100. The heat sink 100 is mainly constituted by the center portion 101 and the disk portion 108. The socket 90 is fitted around the outer circumferential surface of the disk portion 108 to allow the light source unit UN to be supported in the rear opening portion 52b of the housing 52. In this state, the rear end of each radiator fin 109 formed at the disk portion 108 protrudes more to the vehicle-body rear side than the rear end surface of the socket 90.

A low-beam LED light source 111 and a high-beam LED light source 112 are placed above and below the center portion 101, respectively. More specifically, a low-beam support stay 117 is affixed to an upper surface of the center portion 101 with two screws 110, and a high-beam support stay 113 is affixed to a lower surface of the center portion 101 with two screws. The low-beam LED light source 111 and the high-beam LED light source 112 are each supported while being suspended by wires in an opening formed in the corresponding stay. When the stays 117, 113 are thus affixed to the center portion 101, one of the surfaces of each LED light source 111, 112 is in direct contact with the center portion 101, while the other surface is in contact with air. This allows enhanced heat radiation.

A front extension portion 102 is formed on the vehicle-body front side of the center portion 101. In addition, a right extension portion 103R and a left extension portion 103L are formed to the right and left of the center portion 101, respectively. Screws 104 for affixing the low-beam reflector 61 and the high-beam reflector 62 engage with upper and lower surfaces of the right extension portion 103R and the left extension portion 103L. In addition, screws 105 for affixing the aiming plate 80 engage with a vehicle-body front surface of the disk portion 108. Four screws 105 are provided above the center portion 101, and four screws 105 are provided below the center portion 101.

Wires 115, 116 for supplying electric power to the LED light sources 111, 112 are laid between the front extension portion 102 and the right extension portion 103R and between the front extension portion 102 and the left extension portion 103L. A harness 106 formed by bundling the wires 115, 116 is guided by three recessed portions formed in a thinned portion of the front extension portion 102 and by a guide hole formed in the left extension portion 103L, and is then connected to a coupler 114 configured to receive supply of electric power from the vehicle body.

Figure 9:
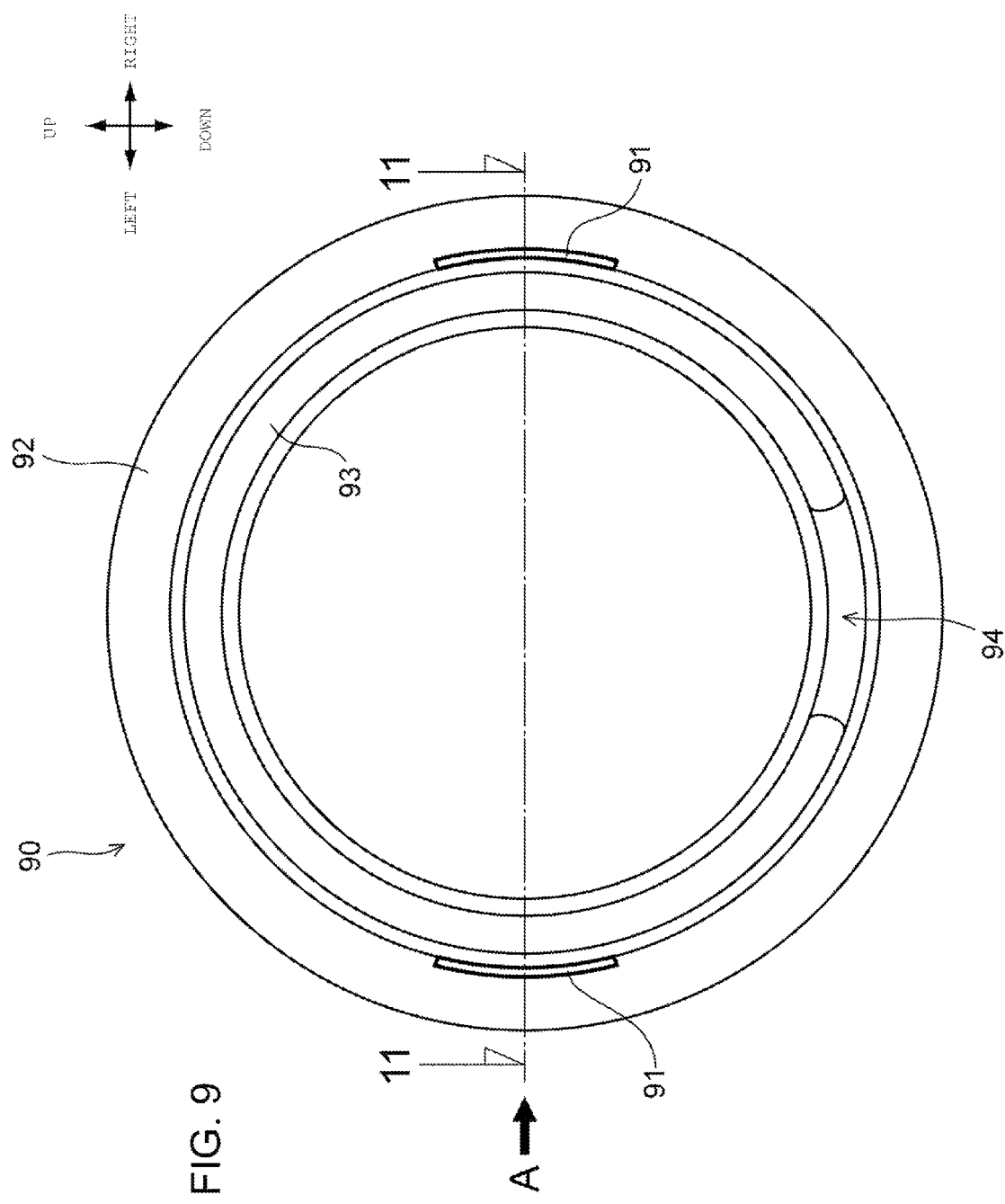
FIG. 9 is a front view of a socket.
Figure 10:
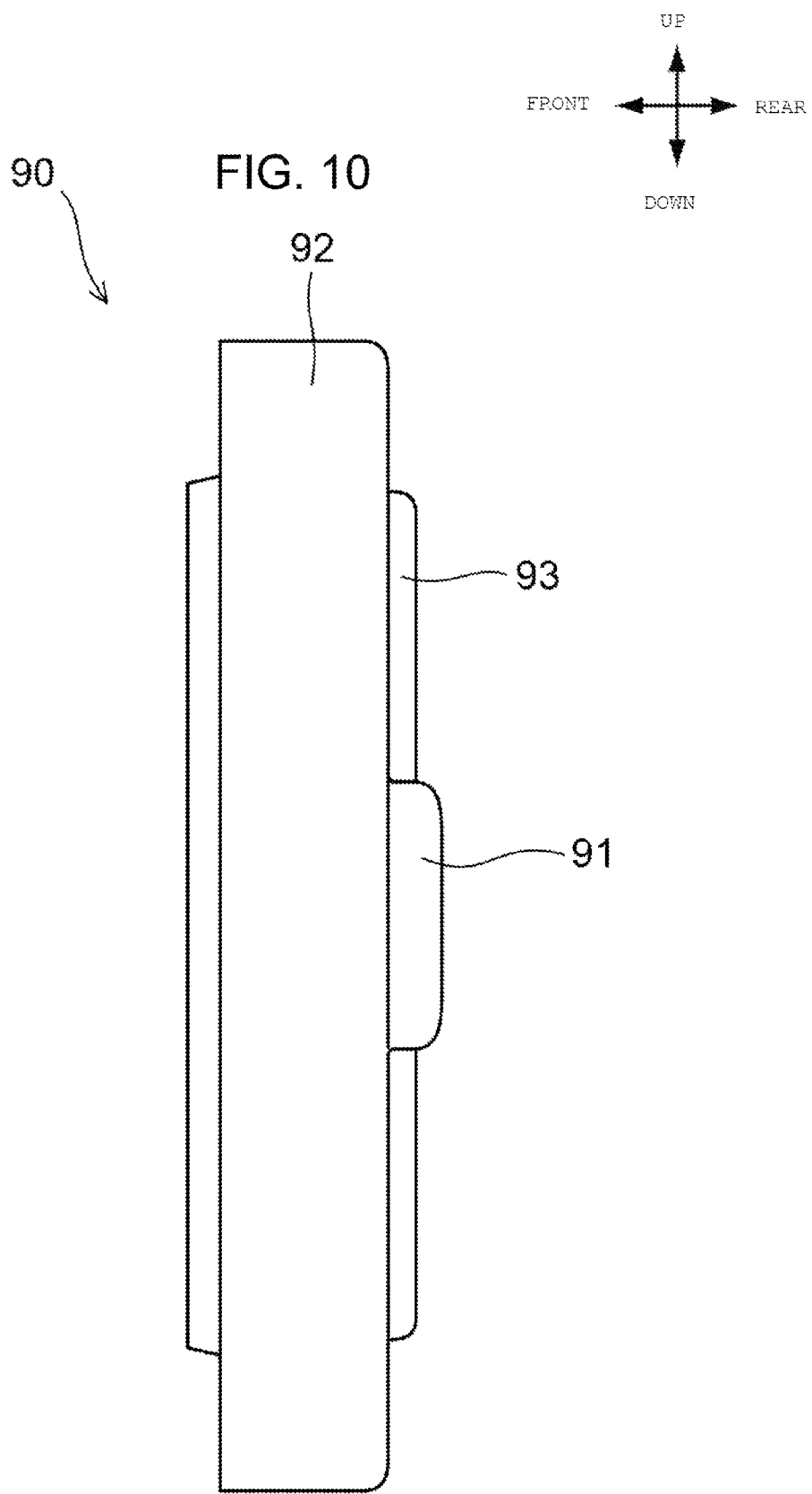
FIG. 10 is a left side view of the socket.
Figure 12:
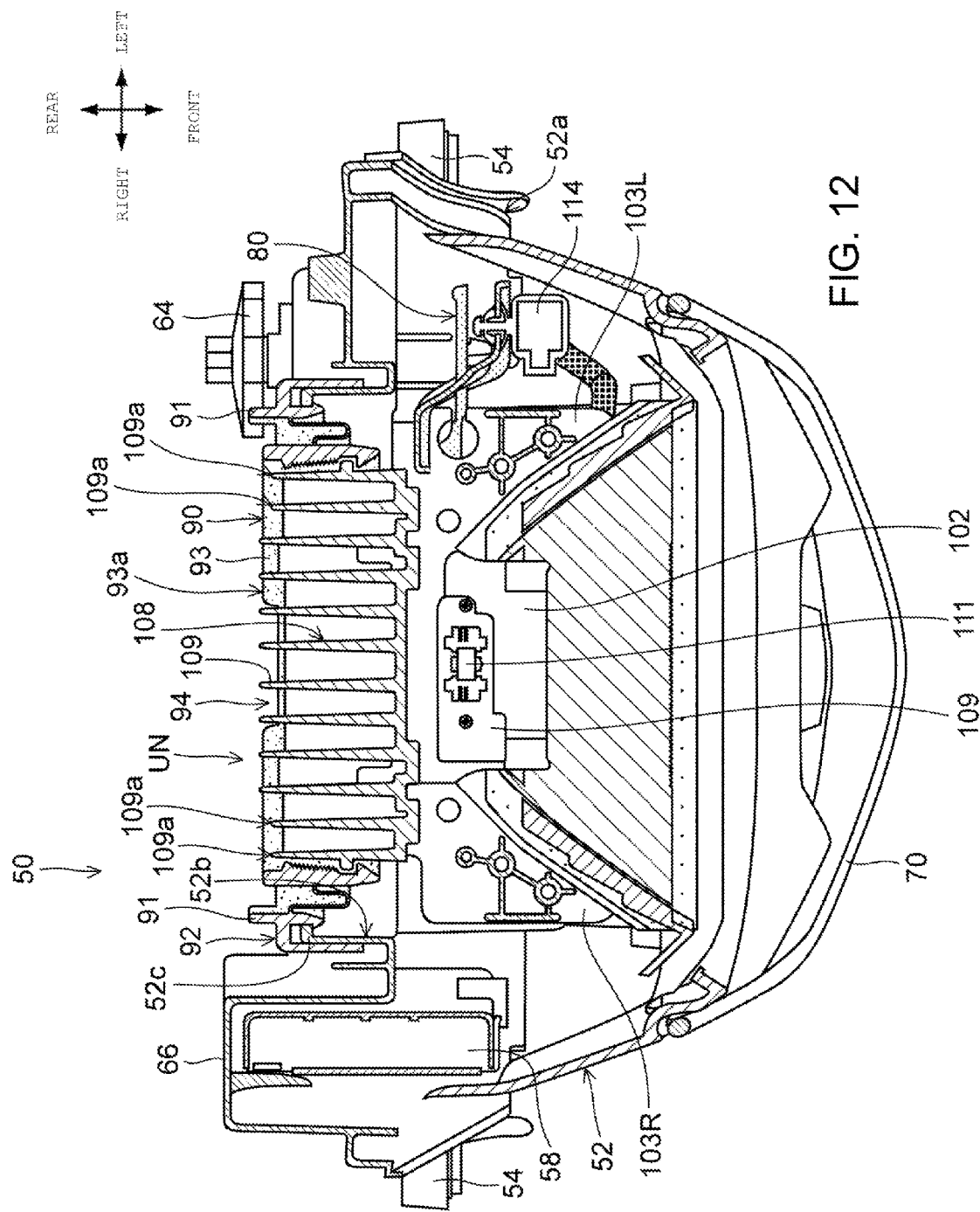
FIG. 12 is a sectional view taken along line 12-12 in FIG. 4.

FIG. 9 is a front view of the socket 90. Moreover, FIG. 10 is a left side view of the socket 90, FIG. 11 is a sectional view taken along line 11-11 in FIG. 9, and FIG. 12 is a sectional view taken along line 12-12 in FIG. 4. The front view in FIG. 9 shows how the socket 90 looks from the vehicle-body rear side when it is attached to the housing 52.

The socket 90 has an outer annular portion 92 fitted and supported in the rear opening portion 52b, an inner annular portion 93 fitted around the disk portion 108 of the heat sink 100, and a thinned portion 96 being interposed between the outer annular portion 92 and the inner annular portion 93 and connecting them together such that they can be displaced relative to each other.

The ribs 91 configured to hinder approach of a hand of a rider to the rear surface of the disk portion 108 are symmetrically formed at inward positions on the outer annular portion 92. A notch 94 is formed at a lower end of the inner annular portion 93 so that moisture may not pool at the annular projecting portion.

Formed on an inner circumferential side of the inner annular portion 93 are a wavy portion 97a configure to be in contact with the outer circumferential surface of the disk portion 108 and an annular hook 97 configured to engage with an annular protrusion 131 (see FIG. 15) formed on the outer circumferential surface of the disk portion 108. The wavy portion 97a has a function to elastically support the disk portion 108, as well as to prevent ingress of moisture and the like. The annular protrusion 131 is formed throughout the outer circumference of the disk portion 108, and once the disk portion 108 is pressed against the socket 90 to a predetermined position to make the annular hook 97 engage with the annular protrusion 131, the disk portion 108 will not be displaced unless a very large force is applied thereto.

Formed on an inner circumferential side of the outer annular hook 92 are an annular hook 98 configured to engage with an annular rib 52c extending along the rear opening portion 52b of the housing 52 and protruding to the vehicle-body rear side (see FIG. 12), and a wavy portion 98a configured to be in contact with an outer circumferential surface of the annular rib 52c.

According to the above configuration, the socket 90 fulfills a function to directly support the heat sink 100 with its inner annular portion 93, as well as to allow the heat sink 100 to be supported in the rear opening portion 52b of the housing 52 with its outer annular portion 92. In this regard, the thinned portion 96 formed between the outer annular portion 92 and the inner annular portion 93 permits the swing action of the heat sink 100 caused by the aiming adjustment.

Figure 13:
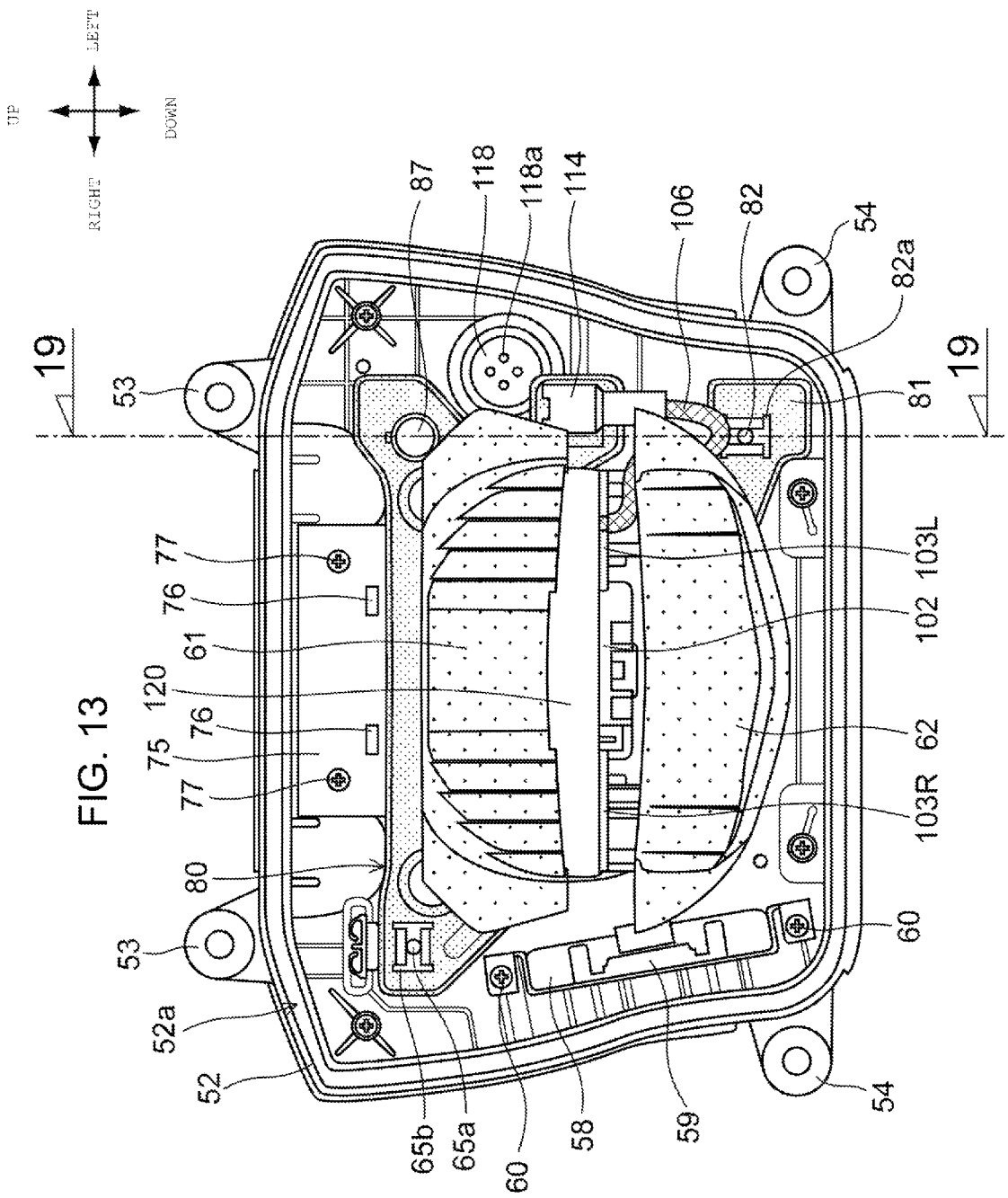
FIG. 13 is a front view of a housing.
Figure 14:
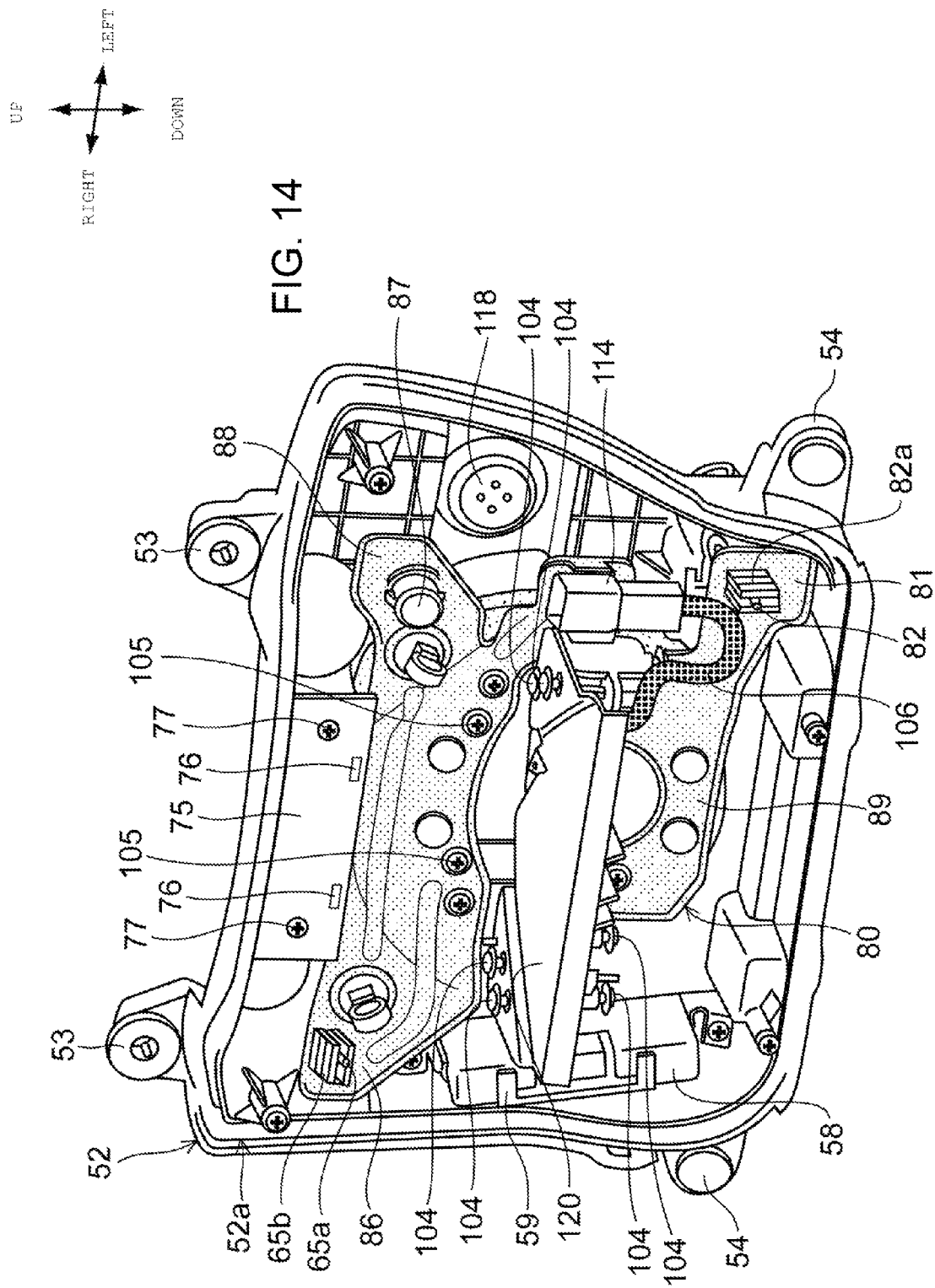
FIG. 14 is a perspective view of the housing.

FIG. 13 is a front view of the housing 52. Moreover, FIG. 14 is a perspective view of the housing 52. FIG. 13 shows a state where the light guide member 70 and the extension 55 are removed from the state in FIG. 4, and FIG. 14 shows a state where the low-beam reflector 61 and the high-beam reflector 62 are removed from the state in FIG. 13.

The aiming plate 80 configured to perform aiming adjustment of the light source unit UN includes an upper aiming plate 86 and a lower aiming plate 89, and these are both affixed to the vehicle-body front surface of the disk portion 108 with the screws 105 and swing integrally with the light source unit UN.

A decorative board 120 is placed on an upper side of the center portion 101 of the heat sink 100 (see FIG. 7). The decorative board 120 has a shape covering upper surfaces of the right extension portion 103R and the left extension portion 103L, and is fastened together with the low-beam reflector 61 and the high-beam reflector 62 by use of the screws 104 for affixing the low-beam reflector 61 and the high-beam reflector 62. This decorative board 120 makes the center portion 101 of the heat sink 100 and the like in the assembled front lamp 50 invisible from the front and above, and thus enables improvement in the outer appearance of the front lamp 50.

A cover 87 configured to cover the swing center of the light source unit UN is provided near a left end portion of the upper aiming plate 86. A holder 65b is attached near a right end portion of the upper aiming plate 86, the holder 65b being configured to engage with a screw portion 65a of the adjustment screw 65 used for performing lateral aiming adjustment and to convert rotation of the adjustment screw 65 into swing action of the aiming plate 80. Meanwhile, a holder 82a is attached to the extension portion 81 provided at a left end portion of the lower aiming plate 89, the holder 82a being configured to convert rotation of the adjustment screw 82 connected to the adjustment knob 64 used for performing vertical aiming adjustment into swing action of the aiming plate 80. A substrate 75 retaining two LED elements 76 being the light source of the light guide member 70 is affixed to an upper center portion of the housing 52 with screws 77. A grommet 118 having through-holes 118a through which power supply lines are passed is attached to a wall surface of the housing 52 at a position rearward of the coupler 114.

Figure 15:
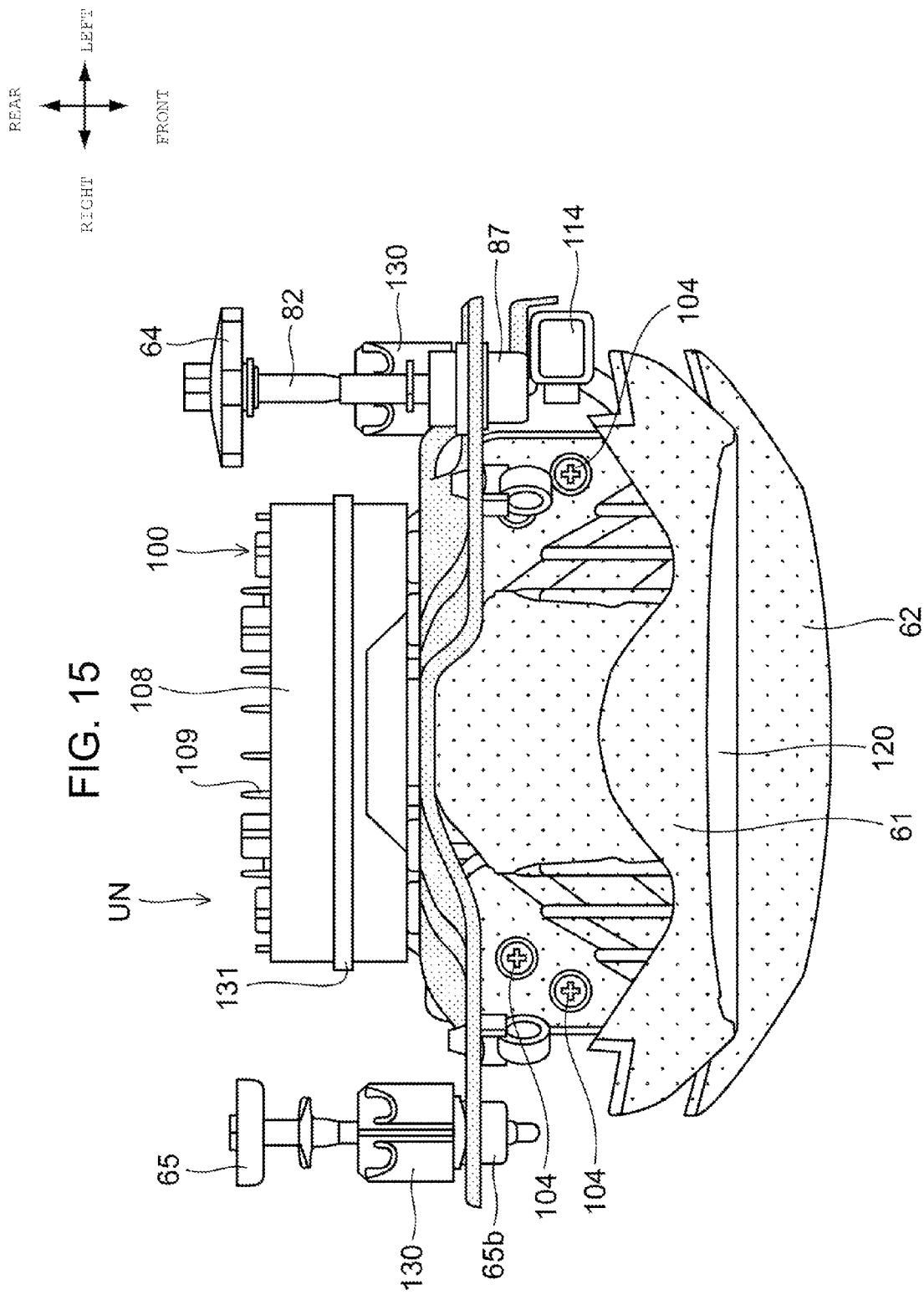
FIG. 15 is a top view of the light source unit.
Figure 16:
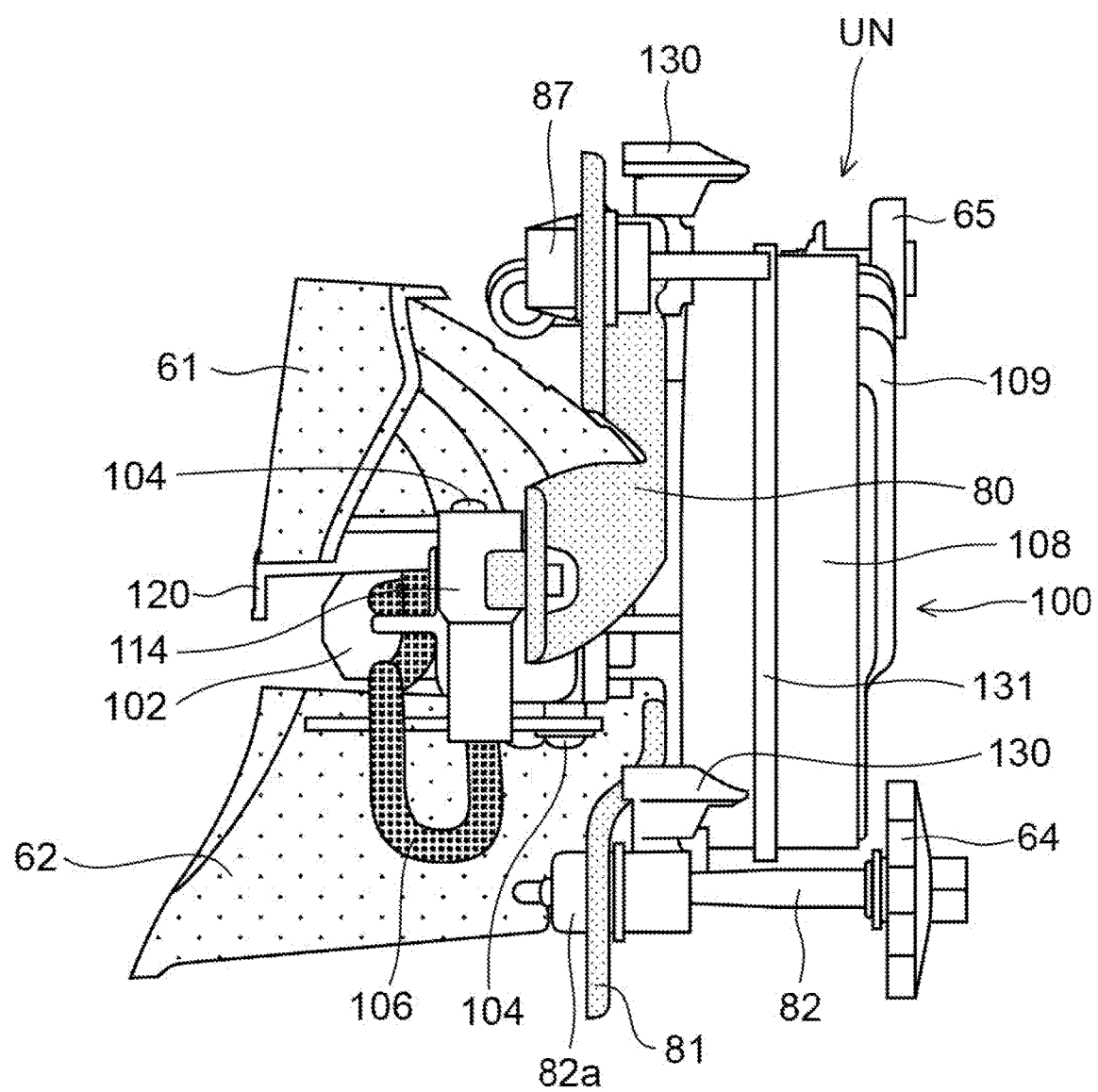
FIG. 16 is a left side view of the light source unit.
Figure 17:
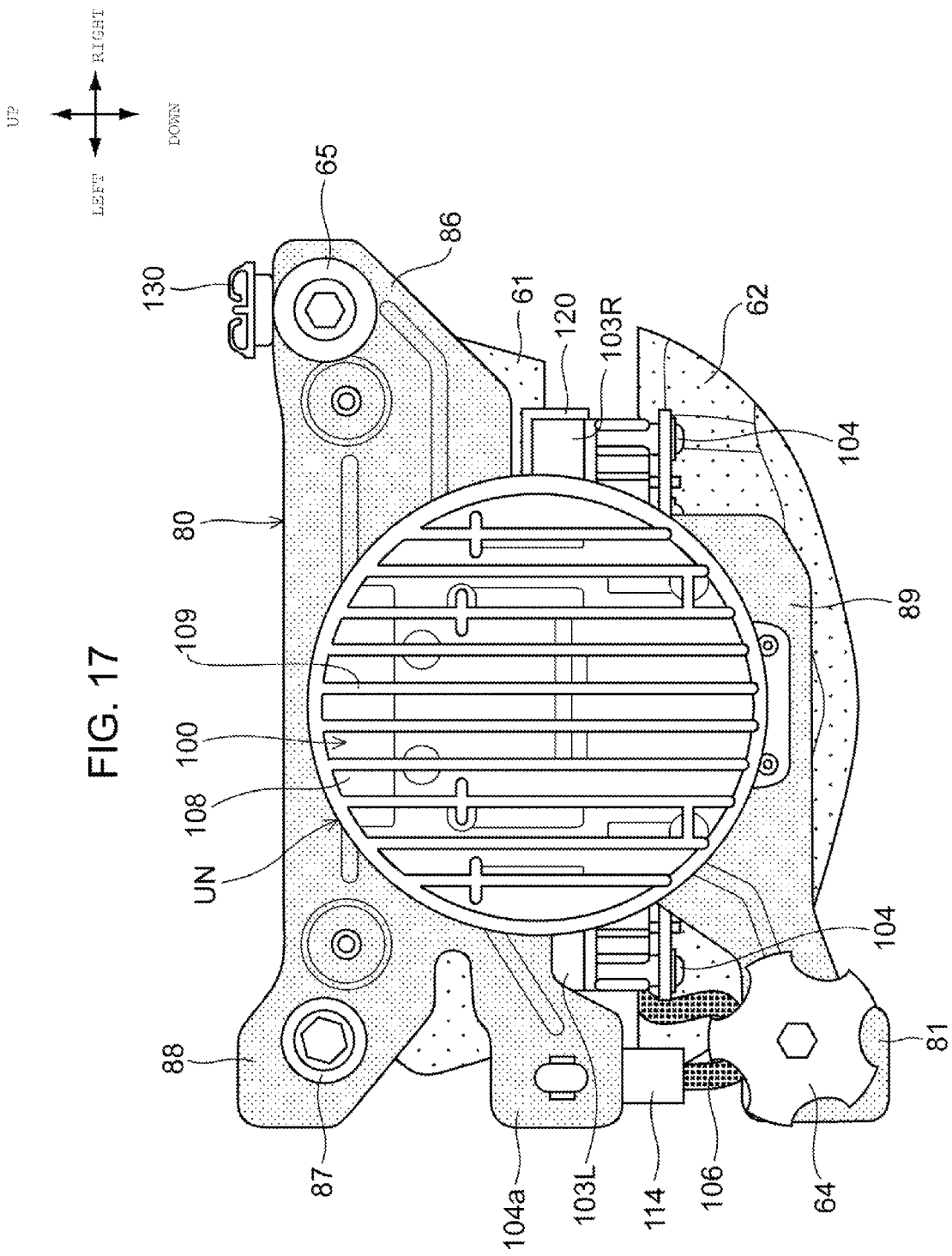
FIG. 17 is a rear view of the light source unit.
Figure 18:
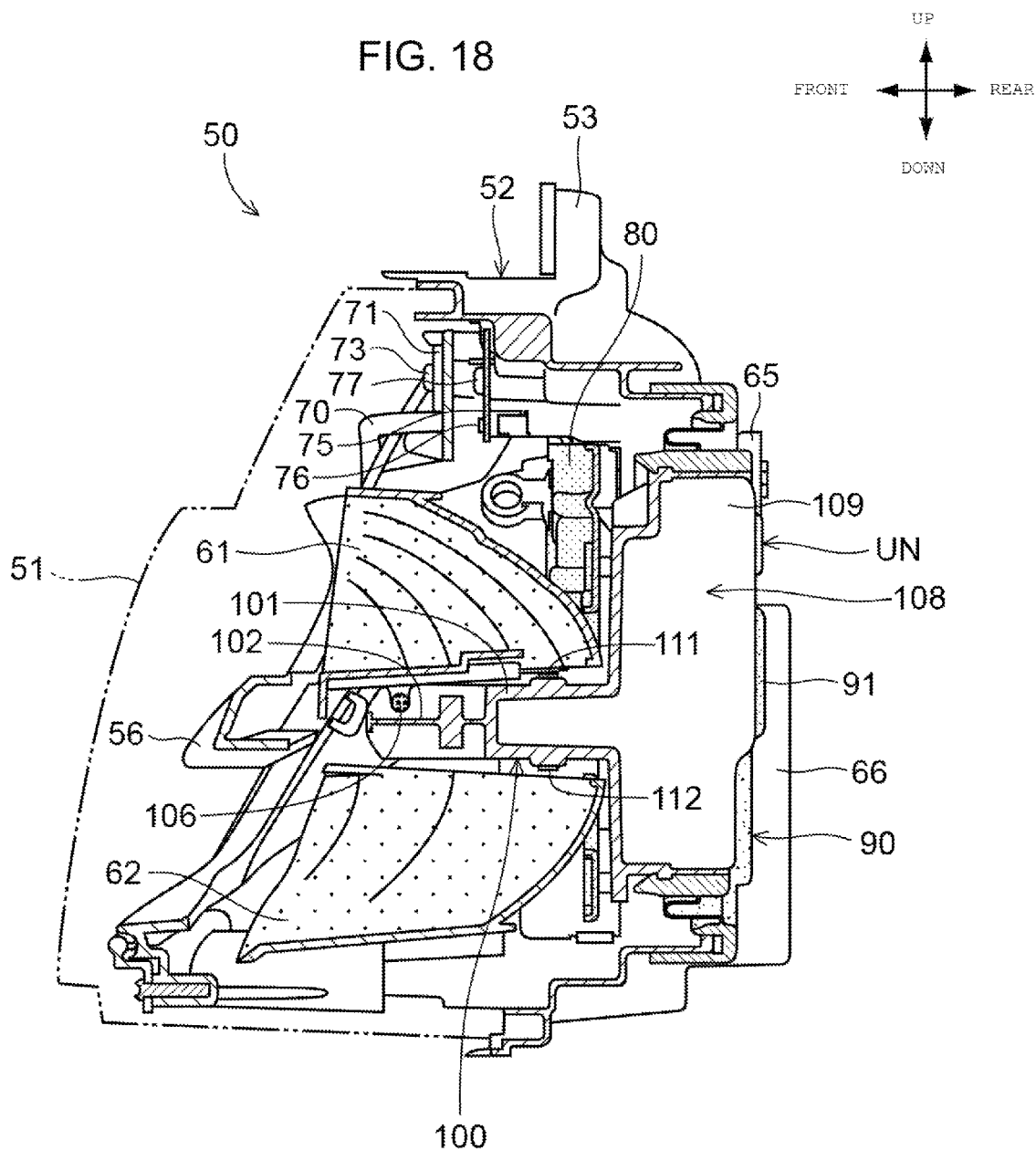
FIG. 18 is a sectional view taken along line 18-18 in FIG. 4.
Figure 19:
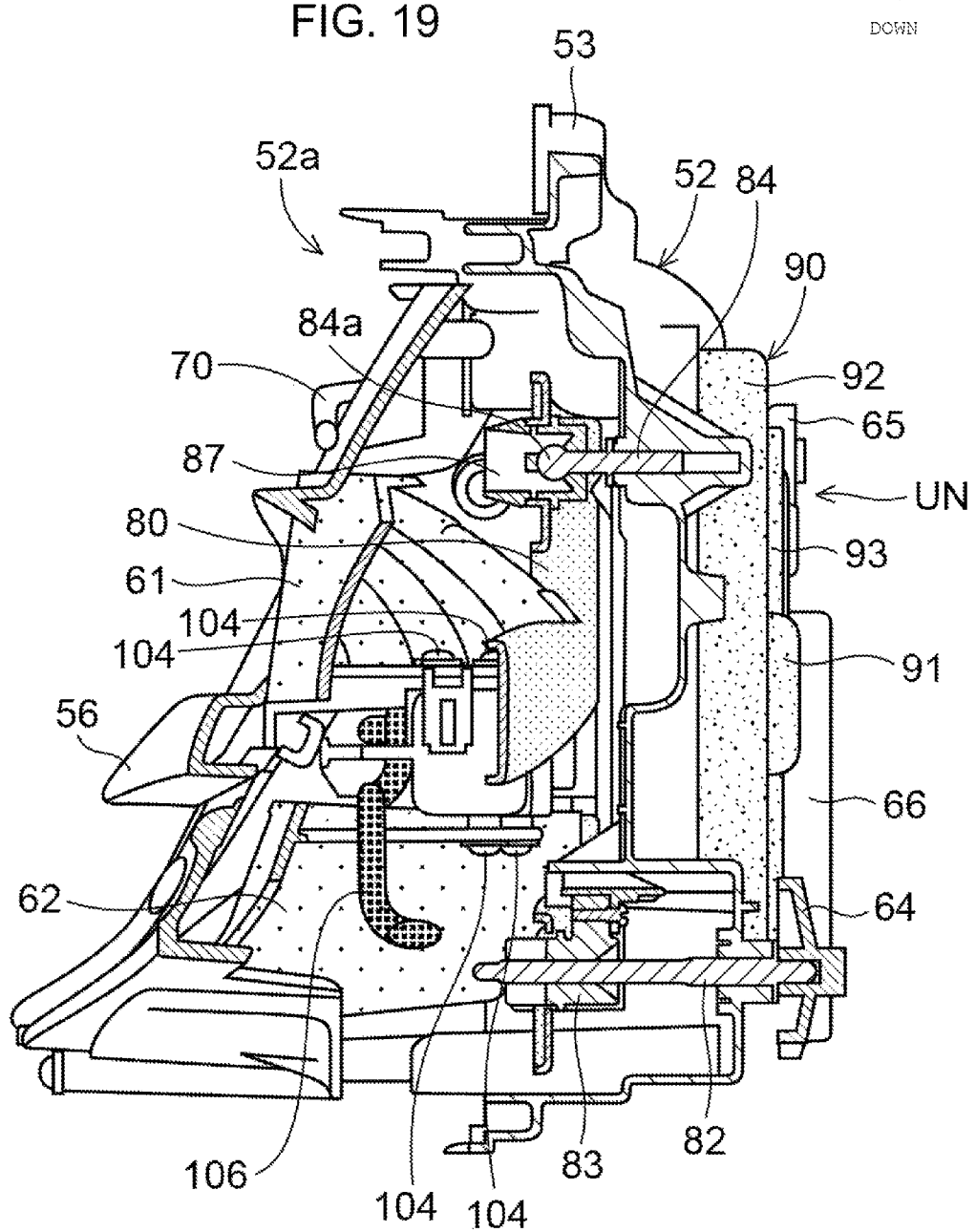
FIG. 19 is a sectional view taken along line 19-19 in FIG. 13.

FIG. 15 is a top view of the light source unit UN. Moreover, FIG. 16 is a left side view of the light source unit UN, FIG. 17 is a rear view of the light source unit UN, FIG. 18 is a sectional view taken along line 18-18 in FIG. 4, and FIG. 19 is a sectional view taken along line 19-19 in FIG. 13. As described earlier, the optical axis adjustment mechanism of the front lamp 50 is achieved by swinging the aiming plate 80 affixed to the light source unit UN. In this embodiment, the aiming plate 80 is formed by being divided into the upper aiming plate 86 and the lower aiming plate 89 according to the shape of the heat sink 100 of the light source unit UN.

The swing center of the aiming plate 80 is formed by screwing the screw 84 into the housing 52 and making a ball portion 84a formed at one end portion of the screw 84 engage with the cover 87 affixed to the upper aiming plate 86.

The holder 65b that enables lateral swing action of the aiming plate is affixed to the housing 52 on the rear-surface side of the upper aiming plate 86, via an engagement member 130. In addition, the holder 82a that enables vertical swing action of the aiming plate 80 is also affixed to the housing 52 on the rear-surface side of the lower aiming plate 89, via another engagement member 130.

As described earlier, the radiator fins 109 are formed on the disk portion 108 of the heat sink 100, extending in the vehicle-body upward and downward directions. Some of these radiator fins 109 that are located at outer sides in the vehicle width direction are formed to be smaller in height than ones at the center portion. Thereby, a rear end portion 109a of each radiator fin 109 at either outer side in the vehicle width direction is located more to the vehicle-body front side than a rear end portion 93a of the inner annular portion 93 of the socket 90. In other words, the radiator fins 109 at the outer sides in the vehicle width direction are formed to be short so as not to protrude rearward of the socket 90. Thus, a configuration that hinders approach of a hand of an operator to the radiator fins 109 is achieved furthermore together with the effect offered by the ribs 91. Moreover, it is also possible to hinder approach of a hand of an operator to the radiator fins 109 during operation of the adjustment knob 64, by reducing the heights of the radiator fins 109 at portions lower than the center.

Referring to FIG. 18, the LED elements 76 mounted on the substrate 75 at the upper portion of the housing 52 are placed adjacent to the end surfaces of the light guide member 70. The reflectors 61, 62 that determine the light distribution properties of low beams and high beams, respectively, have a semi-domed shape irradiating the vehicle-body front side with light emitted upward or downward by the LED light sources 111, 112. The reflectors 61, 62 extend to a position frontward of the front extension portion 102 of the heat sink 100, and the partition portion 56 of the extension 55 is placed frontward of the reflectors 61, 62.

Referring to FIG. 19, the screw 84 about which the aiming plate 80 swings and the screw 82 for the adjustment knob 64 used to perform vertical aiming adjustment are placed above and below the other vertically. When an operator turns the adjustment knob 64, the adjustment screw 82 is rotated, and the aiming plate 80 is thereby moved in the vehicle-body front or rear direction by the holder 82a having a female screw portion 83. Thereby, the aiming plate 80 swings about the ball portion 84a, causing the entire light source unit UN affixed to the aiming plate 80 to swing. Vertical aiming adjustment is carried out in this way.

In this embodiment, the ribs 91 of the socket 90 and the devised shapes of the radiator fins 109 hinder approach of a hand of an operator to the radiator fins 109. Thus, the adjustment knob 64 can be increased in diameter, making it easier to perform the aiming adjustment.

Figure 20:
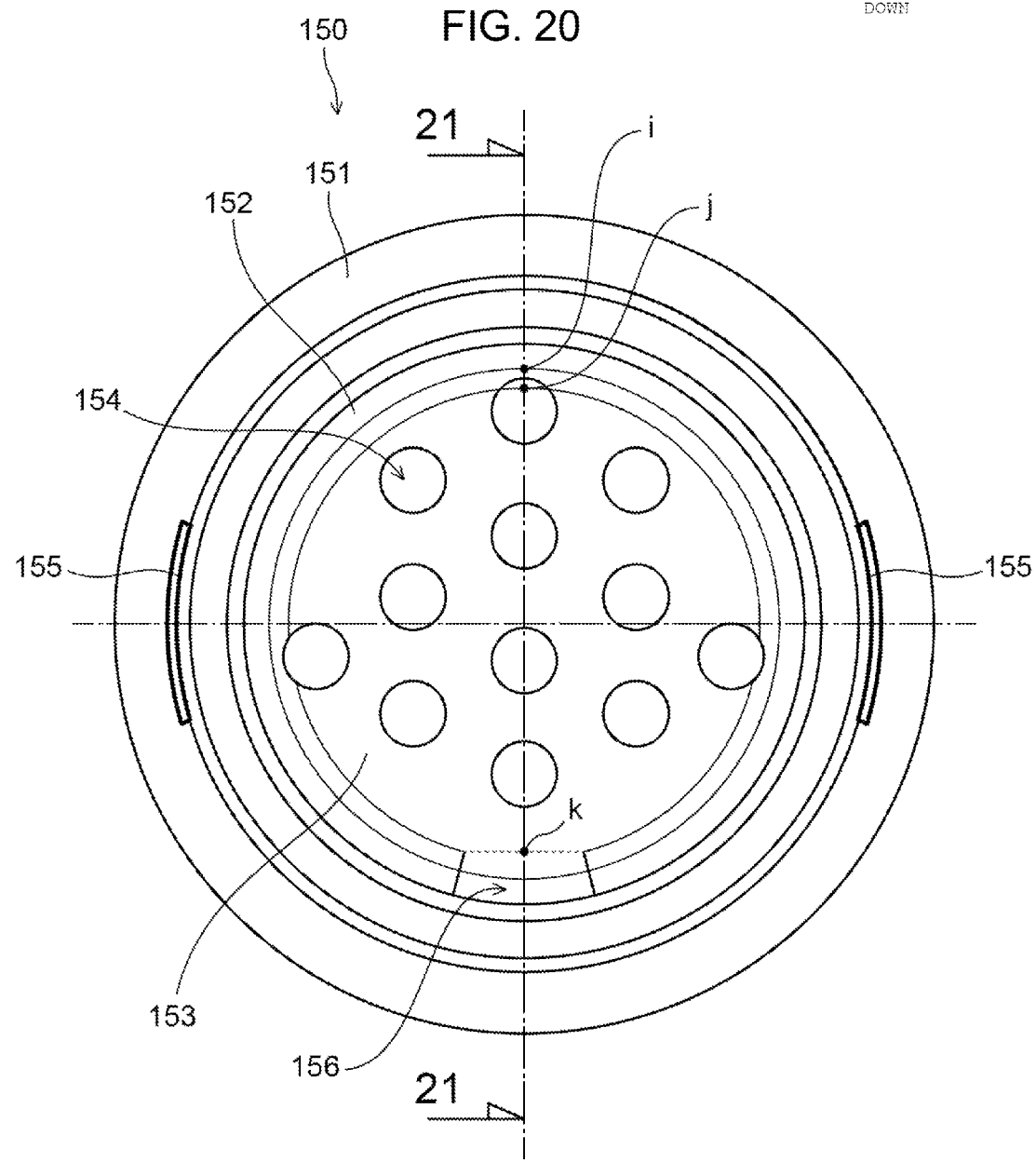
FIG. 20 is a front view of a socket according to a second embodiment of the present invention.

FIG. 20 is a front view of a socket 150 according to a second embodiment of the present invention. Moreover, FIG. 21 is a sectional view taken along line 21-21 in FIG. 20. The socket 150 is different from the socket 90 according to the above embodiment in that the socket 150 is provided with a perforated cover 153 on the rear-surface side of the disk portion 108 of the heat sink 100. Other configurations of the socket 150 are similar, i.e., the socket 150 has an outer annular portion 151 and an inner annular portion 152, has ribs 155 formed at positions close to an inner diameter of the outer annular portion 151, and has a notch 156 at a lower portion of the inner annular portion 152.

In addition, similarly, formed on the inner circumferential side of the outer annular portion 151 are an annular hook 160 configured to engage with the annular rib 52c (see FIG. 12) extending along the rear opening portion 52b of the housing 52 and protruding to the vehicle-body rear side and a wavy portion 161 configured to be in contact with the outer circumferential surface of the annular rib 52c; formed on the inner circumferential side of the inner annular portion 152 are a wavy portion 158 configured to be in contact with the outer circumferential surface of the disk portion 108 and an annular hook 157 configured to engage with the annular protrusion 131 (see FIG. 15) formed on the outer circumferential surface of the disk portion 108; and a thinned portion 159 is provided between the outer annular portion 151 and the inner annular portion 152.

The perforated cover 153 has multiple radiator holes 154 formed therein, and thereby, it is possible to hinder approach of a hand of a rider to the radiator fins 109 during aiming adjustment, while also securing radiation effect of the heat sink 100. The multiple radiator holes 154 are formed symmetrically, and the lowermost center one is provided at a position avoiding the notch 156 for water removal and above a point k where a sectional shape of the cover 153 changes from a curved shape to a flat shape. Meanwhile, the uppermost center one of the radiator holes 154 is provided such that an upper end portion thereof is located at a position between a point j where the sectional shape of the cover 153 changes from a flat shape to a curved shape and a point i located on an inner-diameter-side outline of the inner annular portion 152. Thereby, the uppermost radiator hole 154 is located at as high a position as possible so that heat does not stay at an upper portion of the cover 153.

It should be noted that the shapes and structures of a lens, a light guide member, an extension, a housing, and the like constituting a front lamp, the shape and structure of a heat sink constituting a light source unit, the configuration and attachment structure of an LED light source, the shapes and structures of an aiming plate constituting an aiming mechanism and an adjustment screw as well as an adjustment knob as an adjustment mechanism, the shape and structure of a socket, and the like are not limited to the above embodiments, and can be variously changed. For example, the lighting device according to the present invention can be applied not only to a motorcycle, but also to other various types of vehicles such as a saddle-ride type three- or four-wheel vehicle.

EXPLANATION OF REFERENCE NUMERALS

1 MOTORCYCLE
2 VEHICLE-BODY FRAME
6 HEAD PIPE
7 STEERING HANDLE
8 METER DEVICE
11 FRONT FORK
50 FRONT LAMP (LIGHTING DEVICE)
51 LENS
52 HOUSING
52a FRONT OPENING PORTION
52b REAR OPENING PORTION
64 ADJUSTMENT KNOB
80 AIMING PLATE
82 ADJUSTMENT SCREW (ADJUSTMENT MECHANISM)
90 SOCKET
91 RIB
92 OUTER ANNULAR PORTION
93 INNER ANNULAR PORTION
100 HEAT SINK
108 DISK PORTION
111 LOW-BEAM LED LIGHT SOURCE (LED LIGHT SOURCE)
112 HIGH-BEAM LED LIGHT SOURCE (LED LIGHT SOURCE)
UN LIGHT SOURCE UNIT
P HAND OF OPERATOR
WF FRONT WHEEL

What is claimed is:

1. A lighting device comprising:
a housing including a front opening portion and a rear opening portion;
a lens covering the front opening portion;
a light source unit including an LED light source placed in a space surrounded by the housing and the lens, and a heat sink configured to absorb and radiate heat produced by the LED light source;
a socket formed by an elastic member and configured to allow the heat sink to be fitted and supported in the rear opening portion such that part of the heat sink is exposed rearward through the rear opening portion and that aiming adjustment is enabled by changing a position of the light source unit relative to the housing; and
an aiming adjustment mechanism located outside the rear opening portion and exposed on a rear-surface side of the housing, wherein
a knob used for manually turning the adjustment mechanism is attached to a rear end portion of the adjustment mechanism,
the socket is provided with a rib extending in a circumferential direction of the socket and protruding rearward of the heat sink, and
when an operator puts a hand on the knob to operate the knob, the rib is located between the hand of the operator and the heat sink.

2. The lighting device according to claim 1, wherein
the socket has an outer annular portion fitted and supported in the rear opening portion, an inner annular portion in which the heat sink is fitted and supported, and a thinned portion being interposed between the outer annular portion and the inner annular portion and enabling them to be displaced relative to each other, and
the rib is formed on the outer annular portion.

3. The lighting device according to claim 2, wherein
a plurality of radiator fins are provided by the heat sink, one of said plurality of radiator fins, which is located near the rib, is formed such that a rear end portion thereof is located frontward of a rear end portion of the inner annular portion.

4. A lighting device comprising:
a housing including a front opening portion and a rear opening portion;
a lens covering the front opening portion;
a light source unit including an LED light source placed in a space surrounded by the housing and the lens, and a heat sink configured to absorb and radiate heat produced by the LED light source;
a socket formed by an elastic member and configured to allow the heat sink to be fitted and supported in the rear opening portion such that part of the heat sink is exposed rearward through the rear opening portion and that aiming adjustment is enabled by changing a position of the light source unit relative to the housing; and
an aiming adjustment mechanism located outside the rear opening portion and exposed on a rear-surface side of the housing, wherein
a knob used for manually turning the adjustment mechanism is attached to a rear end portion of the adjustment mechanism,
the socket is provided with a rib extending in a circumferential direction of the socket and protruding rearward of the heat sink, and
the rib is formed in symmetrical shapes at two symmetrical locations which are along a circumferential direction of the socket and face each other.

5. A lighting device comprising:
a housing including a front opening portion and a rear opening portion;
a lens covering the front opening portion;
a light source unit including an LED light source placed in a space surrounded by the housing and the lens, and a heat sink configured to absorb and radiate heat produced by the LED light source;
a socket formed by an elastic member and configured to allow the heat sink to be fitted and supported in the rear opening portion such that part of the heat sink is exposed rearward through the rear opening portion and that aiming adjustment is enabled by changing a position of the light source unit relative to the housing; and
an aiming adjustment mechanism located outside the rear opening portion and exposed on a rear-surface side of the housing, wherein
a knob used for manually turning the adjustment mechanism is attached to a rear end portion of the adjustment mechanism,
the socket is provided with a rib extending in a circumferential direction of the socket and protruding rearward of the heat sink, and
the lighting device is used for a motorcycle,
the motorcycle has a head pipe enabling steering of a steering handle gripped by a driver, and left and right front forks which are provided at left and right front portions of the head pipe, are steered integrally with the steering handle, and have a front wheel attached to lower ends thereof, the lighting device is supported by the head pipe at a position frontward of the left and right front forks, the steering handle is provided with a handle lock mechanism configured to disable the steering handle from turning, with the steering handle being turned to a left side, and the knob is placed at a left side of the heat sink in a vehicle width direction.

6. The lighting device according to claim 2, wherein the rib is formed in symmetrical shapes at two symmetrical locations which are along a circumferential direction of the socket and face each other.

7. The lighting device according to claim 3, wherein the rib is formed in symmetrical shapes at two symmetrical locations which are along a circumferential direction of the socket and face each other.

8. The lighting device according to claim 1, wherein the rib is formed in symmetrical shapes at two symmetrical locations which are along a circumferential direction of the socket and face each other.

9. The lighting device according to claim 2, wherein the lighting device is used for a motorcycle, the motorcycle has a head pipe enabling steering of a steering handle gripped by a driver, and left and right front forks which are provided at left and right front portions of the head pipe, are steered integrally with the steering handle, and have a front wheel attached to lower ends thereof, the lighting device is supported by the head pipe at a position frontward of the left and right front forks, the steering handle is provided with a handle lock mechanism configured to disable the steering handle from turning, with the steering handle being turned to a left side, and the knob is placed at a left side of the heat sink in a vehicle width direction.

10. The lighting device according to claim 3, wherein the lighting device is used for a motorcycle, the motorcycle has a head pipe enabling steering of a steering handle gripped by a driver, and left and right front forks which are provided at left and right front portions of the head pipe, are steered integrally with the steering handle, and have a front wheel attached to lower ends thereof, the lighting device is supported by the head pipe at a position frontward of the left and right front forks, the steering handle is provided with a handle lock mechanism configured to disable the steering handle from turning, with the steering handle being turned to a left side, and the knob is placed at a left side of the heat sink in a vehicle width direction.

11. The lighting device according to claim 1, wherein the lighting device is used for a motorcycle, the motorcycle has a head pipe enabling steering of a steering handle gripped by a driver, and left and right front forks which are provided at left and right front portions of the head pipe, are steered integrally with the steering handle, and have a front wheel attached to lower ends thereof, the lighting device is supported by the head pipe at a position frontward of the left and right front forks, the steering handle is provided with a handle lock mechanism configured to disable the steering handle from turning, with the steering handle being turned to a left side, and the knob is placed at a left side of the heat sink in a vehicle width direction.

12. The lighting device according to claim 4, wherein the lighting device is used for a motorcycle, the motorcycle has a head pipe enabling steering of a steering handle gripped by a driver, and left and right front forks which are provided at left and right front portions of the head pipe, are steered integrally with the steering handle, and have a front wheel attached to lower ends thereof, the lighting device is supported by the head pipe at a position frontward of the left and right front forks, the steering handle is provided with a handle lock mechanism configured to disable the steering handle from turning, with the steering handle being turned to a left side, and the knob is placed at a left side of the heat sink in a vehicle width direction.

13. The lighting device according to claim 6, wherein the lighting device is used for a motorcycle, the motorcycle has a head pipe enabling steering of a steering handle gripped by a driver, and left and right front forks which are provided at left and right front portions of the head pipe, are steered integrally with the steering handle, and have a front wheel attached to lower ends thereof, the lighting device is supported by the head pipe at a position frontward of the left and right front forks, the steering handle is provided with a handle lock mechanism configured to disable the steering handle from turning, with the steering handle being turned to a left side, and the knob is placed at a left side of the heat sink in a vehicle width direction.

14. The lighting device according to claim 7, wherein the lighting device is used for a motorcycle, the motorcycle has a head pipe enabling steering of a steering handle gripped by a driver, and left and right front forks which are provided at left and right front portions of the head pipe, are steered integrally with the steering handle, and have a front wheel attached to lower ends thereof, the lighting device is supported by the head pipe at a position frontward of the left and right front forks, the steering handle is provided with a handle lock mechanism configured to disable the steering handle from turning, with the steering handle being turned to a left side, and the knob is placed at a left side of the heat sink in a vehicle width direction.

15. The lighting device according to claim 8, wherein the lighting device is used for a motorcycle, the motorcycle has a head pipe enabling steering of a steering handle gripped by a driver, and left and right front forks which are provided at left and right front portions of the head pipe, are steered integrally with the steering handle, and have a front wheel attached to lower ends thereof, the lighting device is supported by the head pipe at a position frontward of the left and right front forks, the steering handle is provided with a handle lock mechanism configured to disable the steering handle from turning, with the steering handle being turned to a left side, and the knob is placed at a left side of the heat sink in a vehicle width direction.

* * * * *